United States Patent
Heidecker et al.

(10) Patent No.: US 9,121,276 B2
(45) Date of Patent: Sep. 1, 2015

(54) INJECTION MOLDED SEALS FOR COMPRESSORS

(71) Applicant: EMERSON CLIMATE TECHNOLOGIES, INC., Sidney, OH (US)

(72) Inventors: Matthew J. Heidecker, Troy, OH (US); Jeffrey Jay Lichty, Saint Paris, OH (US); Dennis D. Pax, Piqua, OH (US); Dale Joseph McEldowney, Anna, OH (US); Todd A. Manning, New Carlisle, OH (US); Natalie M. Gehret, Yorkshire, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 9 days.

(21) Appl. No.: 13/948,226

(22) Filed: Jul. 23, 2013

(65) Prior Publication Data

US 2014/0023541 A1    Jan. 23, 2014

Related U.S. Application Data

(60) Provisional application No. 61/674,713, filed on Jul. 23, 2012.

(51) Int. Cl.
*F04C 18/00* (2006.01)
*F01C 19/00* (2006.01)
(Continued)

(52) U.S. Cl.
CPC .......... *F01C 19/005* (2013.01); *B29D 99/0053* (2013.01); *B29D 99/0085* (2013.01);
(Continued)

(58) Field of Classification Search
CPC ............ B29D 99/0053; B29D 99/0085; F01C 19/005; F01C 19/08; F01C 19/12; F01C 19/00; F04C 27/008; F04C 28/26; F04C 18/0215; Y10T 29/49236; Y10T 29/4924; Y10T 29/49242; Y10T 29/49245
USPC .......... 418/55.4, 152, 153, 55.5, 57; 277/407, 277/397, 358, 370, 404, 406, 654; 264/259; 29/527.1, 888.022, 888.023, 888.025, 29/898.041, 888.02; 249/57
See application file for complete search history.

(56) References Cited

U.S. PATENT DOCUMENTS

| 5,036,880 A | 8/1991 | Safford et al. |
| 5,064,356 A | 11/1991 | Horn |

(Continued)

FOREIGN PATENT DOCUMENTS

| EP | 1698784 A1 | 9/2006 |
| GB | 2136439 A | 9/1984 |

(Continued)

OTHER PUBLICATIONS

GLS Corporation, "Overmolding Guide," 2004, pp. 2, 8.*
(Continued)

*Primary Examiner* — Thomas Denion
*Assistant Examiner* — Xiaoting Hu
(74) *Attorney, Agent, or Firm* — Harness, Dickey & Pierce, P.L.C.

(57) ABSTRACT

Improved seal components for compressors, such as scroll compressors, are provided. Such seal components have a molded composite on a seal plate that is preformed, which serves as an improved face seal for floating seal assemblies. The preformed seal plate may be formed of a sintered powder metal or cast gray iron. The molded composite comprises a thermoplastic polymer and at least one reinforcing or lubricating particle. Methods of forming such seal components for a scroll compressor by injection molding are also provided.

9 Claims, 9 Drawing Sheets

(51) Int. Cl.
| | |
|---|---|
| *B29D 99/00* | (2010.01) |
| *F04C 27/00* | (2006.01) |
| *F04C 28/26* | (2006.01) |
| *F04C 18/02* | (2006.01) |

(52) U.S. Cl.
CPC ........... *F04C18/0215* (2013.01); *F04C 27/008* (2013.01); *F04C 28/26* (2013.01); *F04C 2230/22* (2013.01); *F05C 2225/00* (2013.01)

(56) References Cited

U.S. PATENT DOCUMENTS

| | | | |
|---|---|---|---|
| 5,071,329 A | 12/1991 | Sano et al. | |
| 5,076,772 A | 12/1991 | Fraser, Jr. et al. | |
| 5,131,827 A | 7/1992 | Tasaka | |
| 5,229,198 A | 7/1993 | Schroeder | |
| 5,271,679 A | 12/1993 | Yamazumi et al. | |
| 5,486,299 A | 1/1996 | Fuwa et al. | |
| RE35,216 E * | 4/1996 | Anderson et al. | 417/310 |
| 5,509,738 A | 4/1996 | Haynes et al. | |
| 5,568,983 A | 10/1996 | Wilson | |
| 5,603,614 A | 2/1997 | Sakata et al. | |
| 5,649,816 A | 7/1997 | Wallis et al. | |
| 5,676,035 A | 10/1997 | Chrestoff et al. | |
| 5,683,236 A | 11/1997 | Harrison et al. | |
| 5,836,589 A * | 11/1998 | Sakata | 277/407 |
| 5,844,036 A | 12/1998 | Hughes | |
| 5,879,791 A | 3/1999 | Kato et al. | |
| 5,886,080 A | 3/1999 | Mori | |
| 5,938,419 A | 8/1999 | Honma et al. | |
| 5,947,441 A | 9/1999 | Zenker et al. | |
| 5,962,376 A | 10/1999 | Yamazaki et al. | |
| 5,998,339 A | 12/1999 | Kato et al. | |
| 6,068,931 A | 5/2000 | Adam et al. | |
| 6,116,876 A | 9/2000 | Kitano et al. | |
| 6,126,422 A | 10/2000 | Crum et al. | |
| 6,183,137 B1 | 2/2001 | Kojima et al. | |
| 6,267,380 B1 | 7/2001 | Feistel | |
| 6,270,713 B1 | 8/2001 | Crum et al. | |
| 6,305,483 B1 * | 10/2001 | Portwood | 175/371 |
| 6,315,456 B1 | 11/2001 | Tanimoto et al. | |
| 6,332,716 B1 | 12/2001 | Kato et al. | |
| 6,349,943 B1 | 2/2002 | Ishii et al. | |
| 6,378,875 B1 | 4/2002 | Feistel | |
| 6,544,014 B2 | 4/2003 | Kobayashi | |
| 6,575,719 B2 | 6/2003 | Manner et al. | |
| 6,676,296 B2 | 1/2004 | Inoue et al. | |
| 6,695,599 B2 | 2/2004 | Uchida et al. | |
| 6,720,071 B2 | 4/2004 | Ishii | |
| 6,783,338 B2 | 8/2004 | Moroi et al. | |
| 6,814,551 B2 | 11/2004 | Kammhoff et al. | |
| 6,887,052 B1 | 5/2005 | Bush et al. | |
| 6,890,163 B2 | 5/2005 | Uchida et al. | |
| 7,011,111 B2 | 3/2006 | Spiegl et al. | |
| 7,056,590 B2 | 6/2006 | Bickle et al. | |
| 7,144,235 B2 | 12/2006 | Yoshimura et al. | |
| 7,214,043 B2 | 5/2007 | Tsukamoto et al. | |
| 7,235,514 B2 | 6/2007 | Mack, Sr. et al. | |
| 7,290,937 B2 | 11/2007 | Takumi et al. | |
| 7,338,265 B2 | 3/2008 | Grassbaugh et al. | |
| 7,351,766 B2 | 4/2008 | Nabeshima et al. | |
| 7,563,510 B2 | 7/2009 | Nogawa et al. | |
| 7,581,734 B1 * | 9/2009 | McLeod | 277/352 |
| 7,658,600 B2 | 2/2010 | Fujita et al. | |
| 7,708,537 B2 | 5/2010 | Bhatia et al. | |
| 7,762,798 B2 | 7/2010 | Ogasawara et al. | |
| 7,824,567 B2 | 11/2010 | Kaneko | |
| 7,942,642 B2 | 5/2011 | Rini et al. | |
| 7,950,912 B2 | 5/2011 | Sato et al. | |
| 7,967,584 B2 * | 6/2011 | Wang | 418/55.4 |
| 8,684,711 B2 * | 4/2014 | Stover et al. | 418/55.1 |
| 2002/0041812 A1 | 4/2002 | Yokomachi et al. | |
| 2002/0158423 A1 * | 10/2002 | Barinaga et al. | 277/630 |
| 2003/0012659 A1 * | 1/2003 | Seibel et al. | 417/213 |
| 2003/0044294 A1 | 3/2003 | Shintoku et al. | |
| 2003/0085532 A1 | 5/2003 | Spiegl et al. | |
| 2003/0138332 A1 | 7/2003 | Osako et al. | |
| 2004/0190803 A1 | 9/2004 | Deshpande | |
| 2005/0123428 A1 | 6/2005 | Uchida et al. | |
| 2005/0123758 A1 | 6/2005 | Ghasripoor et al. | |
| 2005/0127610 A1 | 6/2005 | Pratesi et al. | |
| 2005/0189725 A1 | 9/2005 | Edwards | |
| 2005/0208313 A1 | 9/2005 | Bickle et al. | |
| 2006/0102240 A1 | 5/2006 | Spiegl et al. | |
| 2006/0198748 A1 | 9/2006 | Grassbaugh et al. | |
| 2007/0069420 A1 * | 3/2007 | Kozyra et al. | 264/259 |
| 2007/0090606 A1 | 4/2007 | Ross et al. | |
| 2007/0108704 A1 * | 5/2007 | Craig et al. | 277/370 |
| 2007/0249506 A1 | 10/2007 | Mack et al. | |
| 2007/0292294 A1 | 12/2007 | Fujita et al. | |
| 2009/0014678 A1 | 1/2009 | Durham | |
| 2009/0028696 A1 | 1/2009 | Gannett et al. | |
| 2009/0028733 A1 | 1/2009 | Duwel | |
| 2009/0060768 A1 | 3/2009 | Takei | |
| 2009/0129716 A1 | 5/2009 | Oya et al. | |
| 2009/0185935 A1 | 7/2009 | Seibel et al. | |
| 2009/0220725 A1 | 9/2009 | Stefan et al. | |
| 2009/0264581 A1 | 10/2009 | Randis | |
| 2009/0277212 A1 | 11/2009 | Kaneko et al. | |
| 2010/0008805 A1 | 1/2010 | Mohamed et al. | |
| 2010/0086426 A1 | 4/2010 | Ohkawa et al. | |
| 2010/0132381 A1 | 6/2010 | Ross et al. | |
| 2010/0202911 A1 | 8/2010 | Ni et al. | |
| 2010/0226805 A1 | 9/2010 | Kulmer | |
| 2010/0239198 A1 | 9/2010 | Iwata | |
| 2010/0252772 A1 | 10/2010 | Kaneko | |
| 2010/0284844 A1 | 11/2010 | Yamaji et al. | |
| 2010/0290726 A1 | 11/2010 | Schlipf et al. | |
| 2011/0081264 A1 | 4/2011 | Ishizono et al. | |
| 2011/0136712 A1 | 6/2011 | Kaneko | |
| 2011/0212290 A1 | 9/2011 | Crawley et al. | |

FOREIGN PATENT DOCUMENTS

| | | |
|---|---|---|
| GB | 2232679 A | 12/1990 |
| GB | 2313632 A | 12/1997 |
| JP | 63-297457 A | 12/1988 |
| KR | 20060096377 A | 9/2006 |

OTHER PUBLICATIONS

International Search Report regarding Application No. PCT/US2013/051628, mailed Oct. 16, 2013.

Written Opinion of International Searching Authority regarding Application No. PCT/US2013/051628, mailed Oct. 16, 2013.

Lancaster, J.K., "Accelerated wear testing of PTFE composite bearing materials," Tribology International, vol. 12, No. 2, pp. 65-75 (Apr. 1979).

Suwa, Takeshi, et al., "Effect of Molecular Weight on the Crystalline Structure of Polytetrafluoroetylene As-Polymerized," Journal of Polymer Science: Polymer Phsics Ed., vol. 13, pp. 2183-2194 (1975).

* cited by examiner

INJECTION MOLDED SEALS FOR COMPRESSORS

CROSS-REFERENCE TO RELATED APPLICATIONS

This application claims the benefit of U.S. Provisional Application No. 61/674,713, filed on Jul. 23, 2012. The entire disclosure of the above application is incorporated herein by reference.

FIELD

The present disclosure relates to improved seal designs and more specifically to new injection-molded floating seal designs for scroll compressors and methods for making such seals.

BACKGROUND

This section provides background information related to the present disclosure which is not necessarily prior art.

Scroll machines in general, and particularly scroll compressors, are often disposed in a hermetic shell which defines a chamber within which is disposed a working fluid. A partition within the shell often divides the chamber into a discharge pressure zone and a suction pressure zone. In a low-side arrangement, a scroll assembly is located within the suction pressure zone for compressing the working fluid. Generally, these scroll assemblies incorporate a pair of intermeshed spiral involute portions, one or both of which orbit relative to the other, so as to define one or more moving chambers which progressively decrease in size as they travel from an outer suction port towards a central discharge port. An electric motor is normally provided which operates to cause this relative orbital movement.

The partition within the shell allows compressed fluid exiting the central discharge port of the scroll assembly to enter the discharge pressure zone within the shell, while simultaneously maintaining the integrity between the discharge pressure zone and the suction pressure zone. The partition normally includes a seal, such as a floating seal assembly. The seal interacts with the partition and with the scroll member defining the central discharge port, so as to maintain a pressure differential within the compressor. Conventional air conditioning scroll compressors typically rely upon the floating seal package's ability to form a metal/metal face seal with a portion of the partition, such as a partition plate (e.g., muffler plate) or the shell, during compressor operation. This sealing joint provides separation of the high pressure side and low pressure side of the compressor. This seal occurs in a marginally lubricated thermal environment where steady-state temperatures upwards of 120° C. are commonly reached. Such a floating seal assembly is exposed to harsh environmental conditions and pressure differences and thus potentially suffers from excessive wear. The present teachings provide improved floating seal designs with greater robustness and enhanced anti-wear properties.

SUMMARY

This section provides a general summary of the disclosure, and is not a comprehensive disclosure of its full scope or all of its features.

The present disclosure provides inventive seal components for use in seal assemblies for compressors. In certain variations, the compressor is a scroll compressor. In one variation, a seal assembly for a compressor is provided that comprises a preformed seal plate and a molded portion overmolded onto a region of the preformed seal plate. The molded portion comprises a polymer and at least one reinforcing or lubricating particle. In certain aspects, the polymer is a thermoplastic polymer. The molded portion also defines a face seal contact surface.

In other variations, the present disclosure provides a scroll compressor comprising a first non-orbiting scroll member having a baseplate defining a first side and a second side opposite to the first side. The first side comprises an involute portion extending from the baseplate. The second side comprises a cavity having a floating seal assembly disposed therein. The floating seal assembly comprises a preformed seal plate and a molded portion overmolded onto a region of the preformed seal plate. The molded portion comprises a polymer and at least one reinforcing or lubricating particle. In certain aspects, the polymer is a thermoplastic polymer. The molded portion further defines a face seal contact surface. The scroll compressor also comprises a wear surface on a partition plate (e.g., a muffler plate) or an internal partition, which may include a shell of the compressor, that interfaces with at least a region of the face seal contact surface of the molded portion.

In yet other variations, methods of forming seal components for a scroll compressor are provided. In certain variations, a method of making a seal assembly for a scroll compressor optionally comprises disposing a preformed seal plate defining at least one locking feature in a mold cavity. One or more void regions are present within the mold cavity adjacent to the at least one locking feature. The method also comprises injection molding a composite precursor material comprising a resin and at least one reinforcing or lubricating particle into the one or more void regions in the mold cavity. In certain aspects, the resin is a thermoplastic resin. The precursor material is solidified to form a composite material defining a molded portion attached to the seal plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 7A:
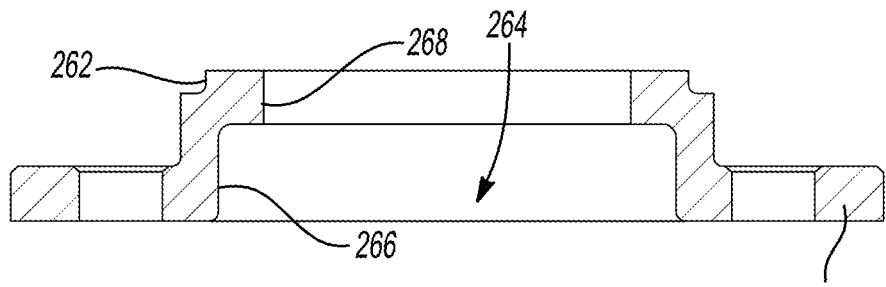
Figure 7B:
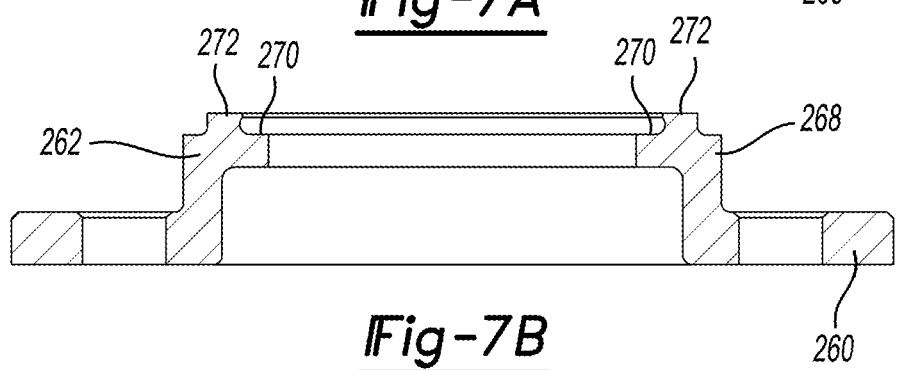
Figure 7C:
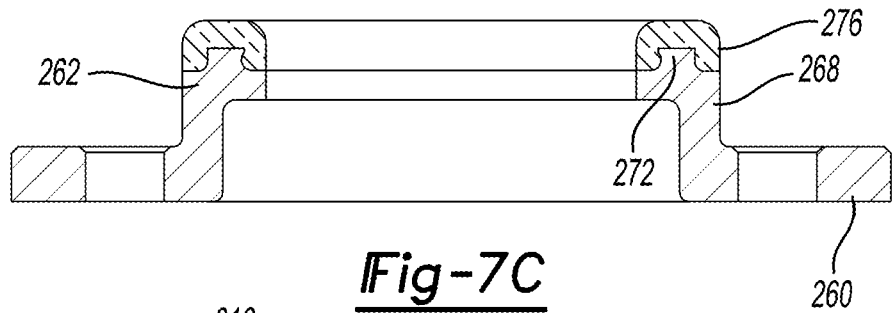
Figure 8:
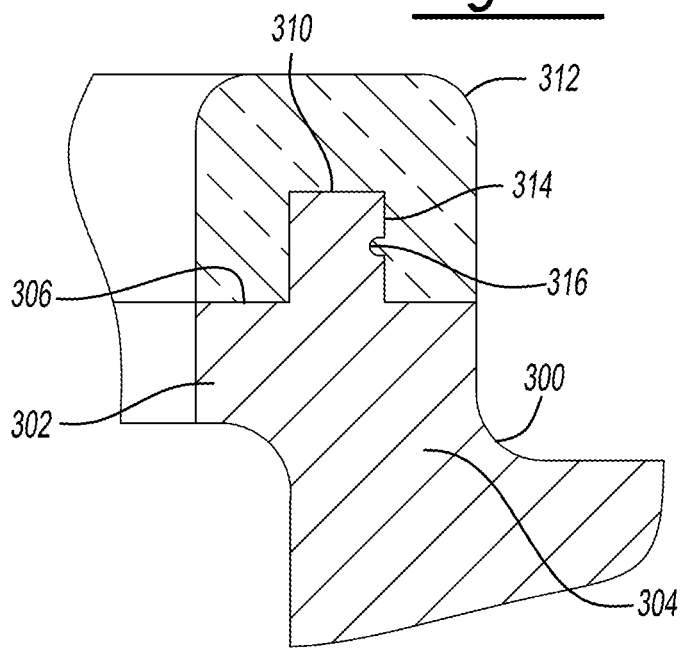
Figure 9:
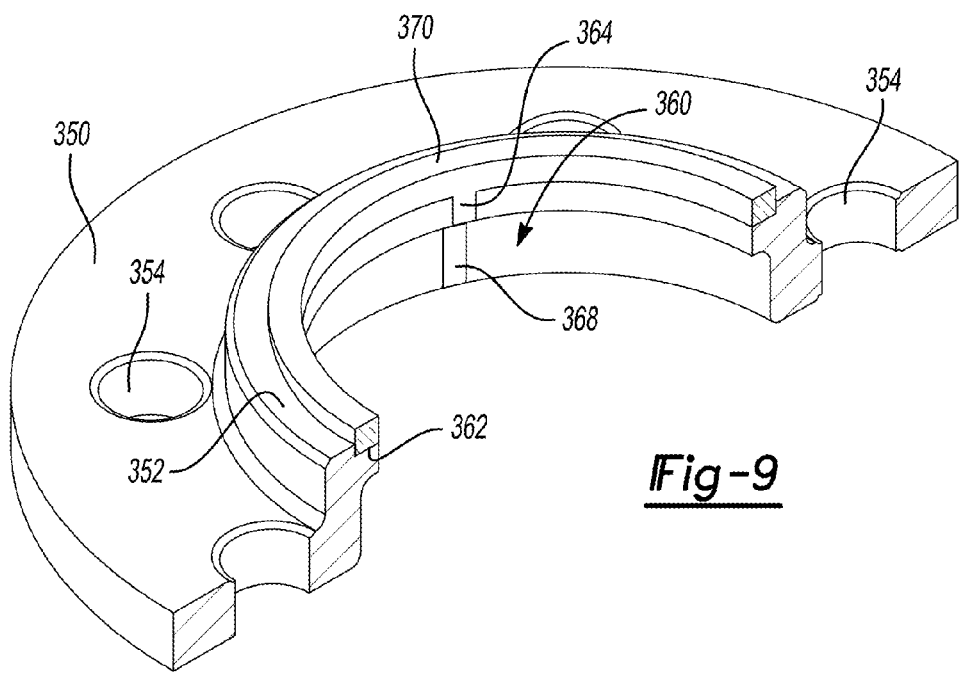
Figure 10:
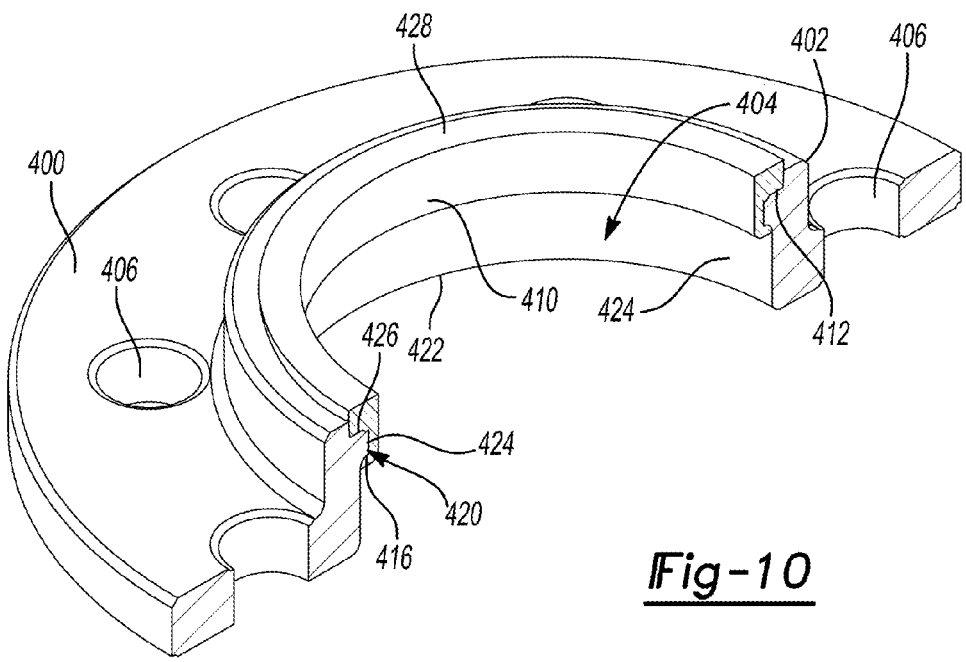
Figure 11A:
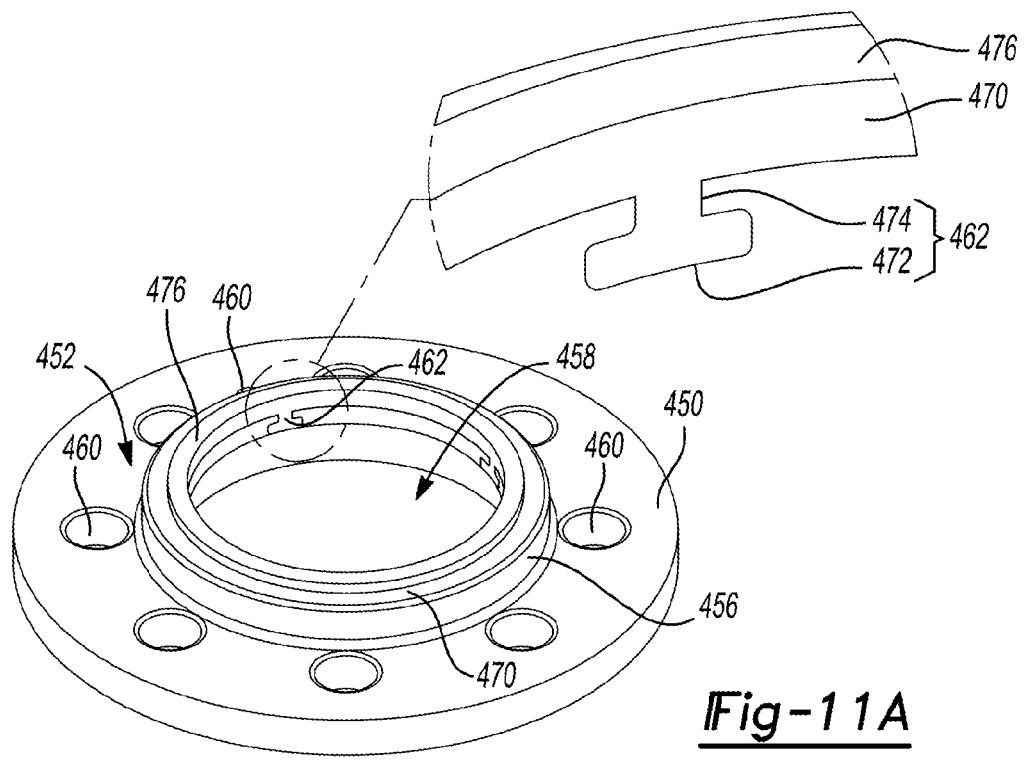
Figure 11B:
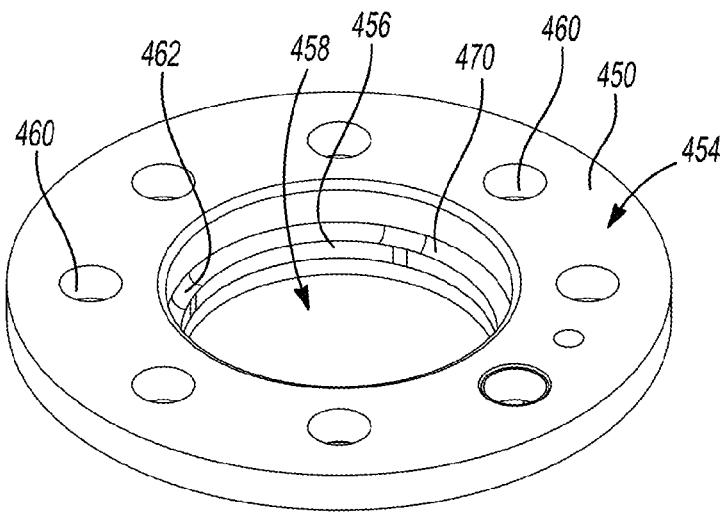
Figure 12A:
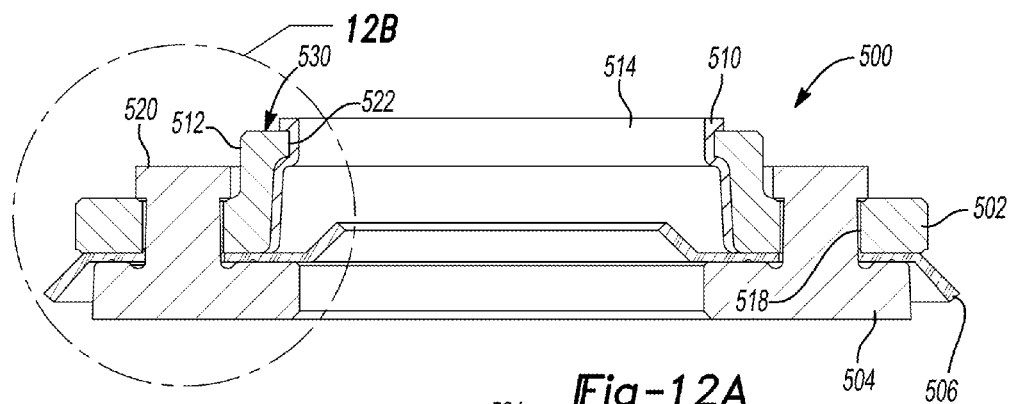
Figure 12B:
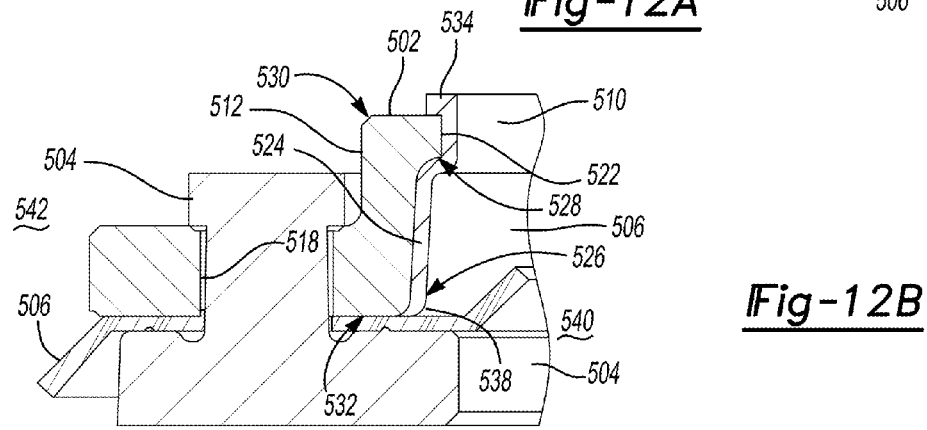
Figure 13:
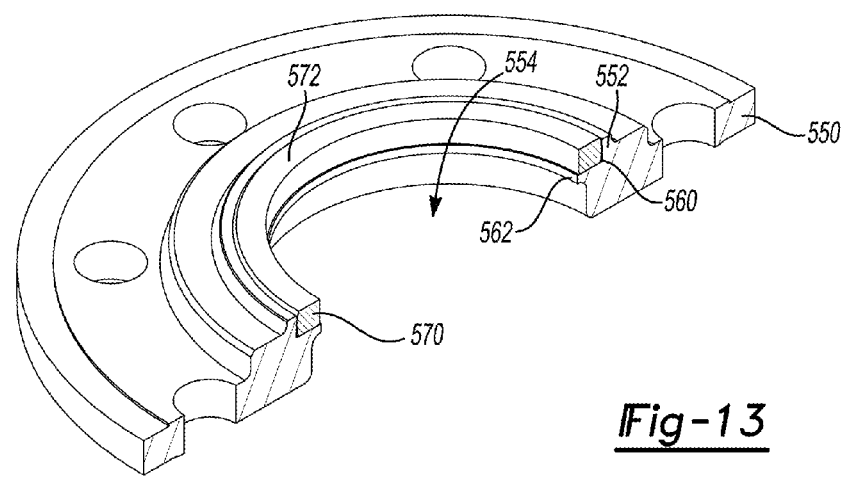
Figure 14:
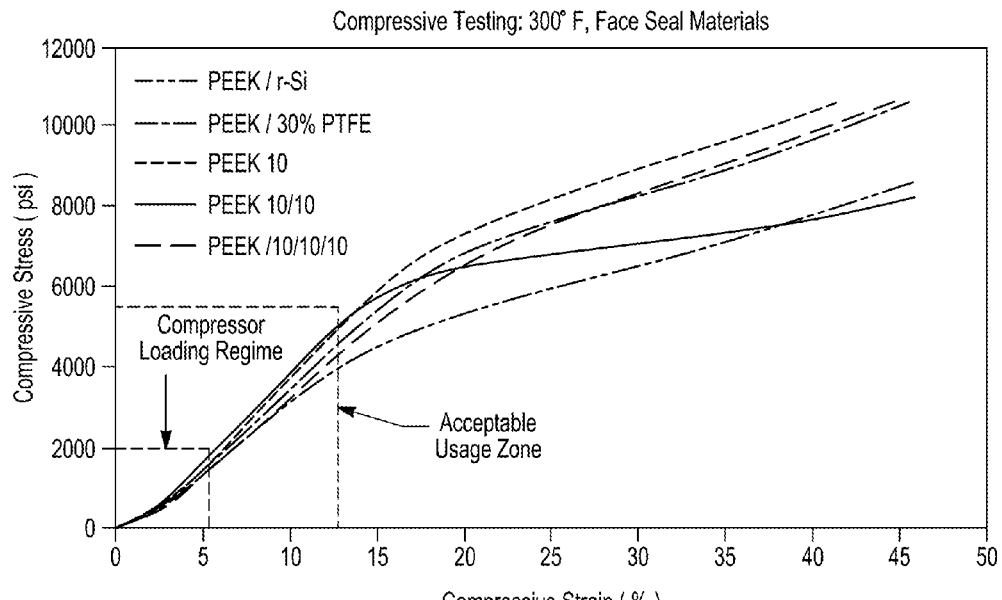
Figure 15:
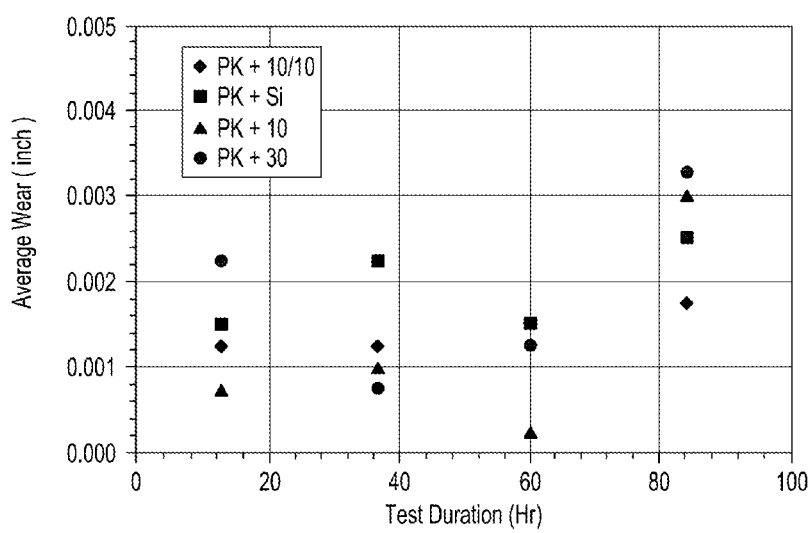

FIGS. 7A-7C show intermediate steps of formation of certain seal assembly components according to certain aspects of the present disclosure. FIG. 7A shows a near net shape powder metal upper seal plate. FIG. 7B shows a machined circumferential groove that defines a centrally disposed annular protrusion, which serves as a locking feature. FIG. 7C shows a final seal assembly product that comprises the upper seal plate having a molded portion overmolded to the circumferential groove (and locking feature) of the upper seal plate;

FIG. 8 is a detailed sectional view of a seal assembly comprising a seal plate and a molded top portion according to certain alternative variations of the present disclosure;

FIG. 9 is a sectional view of a seal assembly comprising a seal plate and a molded top portion, where the seal plate has a plurality of longitudinal channel locking features circumferentially spaced around the centrally disposed opening in the seal plate according to certain aspects of the present disclosure;

FIG. 10 is a sectional view of a seal assembly comprising a seal plate and a molded top portion, where the seal plate defines a transversely extending annular protrusion locking feature disposed around the centrally disposed opening in the seal plate according to certain variations of the present disclosure;

FIGS. 11A-11B respectively show a top and bottom view of a seal assembly according to certain embodiments of the present disclosure having a seal plate and a molded portion, where the seal plate defines a plurality of channels that terminate in a wing locking feature circumferentially spaced about a centrally disposed opening in the seal plate;

FIGS. 12A-12B show a sectional view of a seal assembly comprising an upper seal plate with a molded top portion coupled to a lower seal plate according to certain alternative aspects of the present disclosure, where the seal plate defines a circumferential flange as a locking feature and where the molded portion extends to a tip seal sandwiched between the upper and lower deal plates. FIG. 12B is a detailed view of a portion of FIG. 12A;

FIG. 13 shows a sectional view of a seal assembly comprising a seal plate and a molded top portion, where the seal plate defines a circumferential shoulder locking feature formed around the centrally disposed opening in the seal plate, and where the molded portion is a ring seated on the circumferential shoulder locking feature according to certain variations of the present disclosure;

FIG. 14 shows comparative compressive stress testing for various composite material candidates according to certain aspects of the present teachings (showing compressive stress (pounds per square inch) versus compressive strain (%) at 300° F.; and FIG. 15 shows comparative wear testing for various composite material candidates according to certain aspects of the present teachings (showing average wear (per inch) versus test duration (hours)).

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

In various aspects, the present teachings provide an improved seal design for use as a component in a compressor, such as a scroll compressor. For example, the inventive floating seal designs can be used in multiple different kinds of compressors, including scroll, rotary vane, centrifugal, single screw, twin screw, reciprocating, and the like. In certain variations, this disclosure provides a molded composite that serves as a semi-compliant face seal in a floating seal assembly. In certain preferred aspects, the polymer of the molded composite is a thermoplastic polymer. Such a thermoplastic composite provides greater ability to conform to a partition (such as a partition plate, a muffler plate, or a shell) and allows changes to a floating seal assembly design, as well as the corresponding partition plate (e.g., muffler plate or shell) design, to enhance sealability and seal performance. It also allows the elimination of the hardened wear plate washer, attached to the partition or muffler plate, by introducing the thermoplastic composite to the face seal component, which provides enhanced wear resistance. In certain variations, the improved seal design includes an injection-molded portion of the floating seal for use in scroll compressors.

Figure 1:
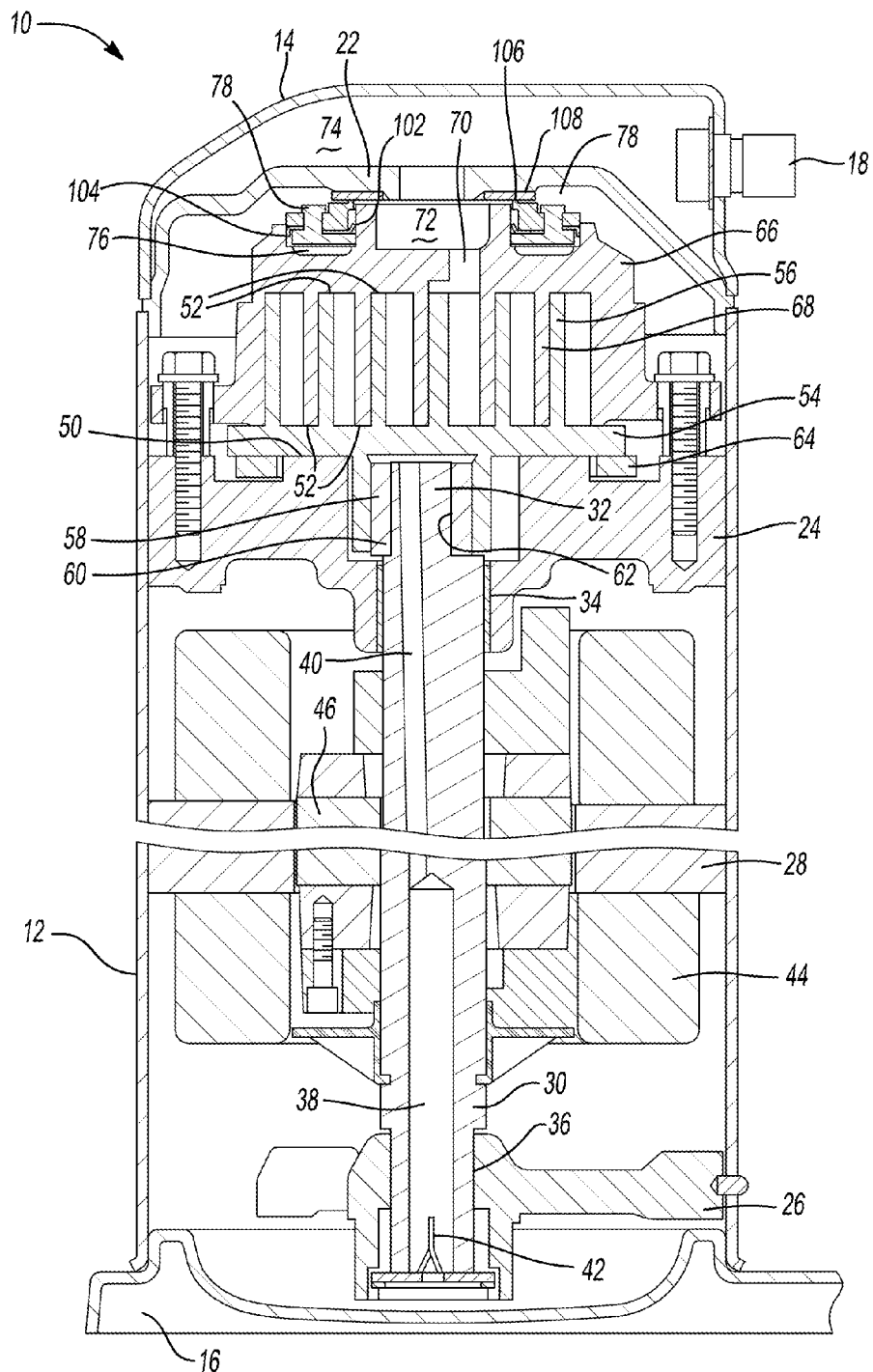
FIG. 1 is a sectional view through a center of a scroll compressor having a conventional design.

By way of background, a conventional hermetic refrigerant scroll compressor is described in the context of FIG. 1. A scroll compressor 10 comprises a generally cylindrical hermetic shell 12 having welded at the upper end thereof a cap 14 and at the lower end thereof a base 16. Cap 14 is provided with a refrigerant discharge fitting 18 which may have the usual discharge valve componentry therein (not shown). Other major elements affixed to the shell 12 include a transversely extending partition, which as shown here as a partition plate 22, which is connected about its periphery at the same point that cap 14 is attached to shell 12. A stationary main bearing housing or body 24 is suitably secured to shell 12, and a lower bearing housing 26 also having a plurality of radially outwardly extending legs, each of which is also suitably secured to shell 12. A motor stator 28 is disposed within shell 12. The flats between the rounded corners on the motor stator 28 provide passageways between the stator 28 and shell 12, which facilitate the flow of lubricant from the top of the shell to the bottom.

A drive shaft or crankshaft 30 having an eccentric crank pin 32 at the upper end thereof is rotatably journaled in a bearing 34 in main bearing housing 24 and a second bearing 36 in lower bearing housing 26. Crankshaft 30 has at the lower end a relatively large diameter concentric bore 38 which communicates with a radially outwardly inclined smaller diameter bore 40 extending upwardly therefrom to the top of the crankshaft. Disposed within bore 38 is a stirrer 42. The lower portion of the interior shell 12 is filled with lubricating oil, and bore 38 serves to pump lubricating fluid up the crankshaft 30 and into bore 40, and ultimately to all of the various portions of the compressor which require lubrication. Crankshaft 30 is rotatively driven by an electric motor including stator 28, windings 44 passing therethrough and a rotor 46 press-fitted on the crankshaft 30.

An upper surface of main bearing housing 24 is provided with a flat thrust bearing surface 50 on which is disposed an orbiting scroll member 54 defining the usual spiral vane or involute portion 56. Projecting downwardly from the lower surface of orbiting scroll member 54 is a cylindrical hub 58 having a journal bearing therein and in which is rotatively disposed a drive bushing 60 having an inner bore 62 in which crank pin 32 is drivingly disposed. Crank pin 32 has a flat on one surface which drivingly engages a flat surface (not shown) formed in a portion of bore 62 to provide a radially compliant driving arrangement. An Oldham coupling 64 is positioned between and keyed to orbiting scroll member 54 and a non-orbiting scroll member 66 to prevent rotational movement of orbiting scroll member 54.

Non-orbiting scroll member 66 is also provided having a non-orbiting involute portion 68 positioned in meshing engagement with orbiting involute portion 56 of orbiting scroll member 54. Non-orbiting scroll member 66 has a centrally disposed discharge passage 70 communicating with an upwardly open recess 72 which is in fluid communication with a discharge muffler chamber 74 defined by cap 14 and partition plate 22 through an opening defined by the partition plate 22. It should be noted that while the exemplary design only shows the partition plate 22, which can serve as a muffler plate, a variety of conventional known designs can alternatively be attached to the shell 12 or partition, including as assembly of plates or components or an external shell/housing.

Thus, the orbiting involute portion 56 and non-orbiting involute portion involute portions 68 (of the two scroll members 54, 56) are arranged together with one of the scroll involute portions being rotationally displaced 180° from the other. The scroll compressor 10 operates by orbiting the involute portion 56 of orbiting scroll member 54 with respect to the other involute portion 68 of stationary non-orbiting scroll member 66, thus making moving line contacts between the flanks of the respective involute portions 56, 68, thus defining moving isolated crescent-shaped pockets of fluid. The moving fluid pockets carry the fluid to be handled from a first zone in the scroll machine where a fluid inlet is provided, to a second zone in the machine where a fluid outlet is provided. The volume of a sealed pocket changes as it moves from the first zone to the second zone. At any one instant in time there will be at least one pair of sealed pockets; and where there are several pairs of sealed pockets at one time, each pair will have different volumes. In the compressor 10, the second zone is at a higher pressure than the first zone and is physically located centrally in the compressor 10, the first zone being located at the outer periphery of the compressor 10.

Two types of contacts define the fluid pockets formed between the scroll members 54, 66, axially extending tangential line contacts between the spiral faces or flanks of the involute portions 56, 68 caused by radial forces ("flank sealing"), and area contacts caused by axial forces between the plane edge surfaces defined by terminal edges or tips 52 of each involute portion 56, 68 and the opposite end plate ("tip sealing"). For high efficiency, optimizing sealing for both types of contacts is important.

One of the difficult areas of design in a scroll-type machine concerns the technique used to achieve tip sealing under all operating conditions, and also at all speeds in a variable speed machine. Conventionally, this has been accomplished by (1) using extremely accurate and very expensive machining techniques, (2) providing the involute portion tips 52 with spiral tip seals, which, unfortunately, are hard to assemble and often unreliable, or (3) applying an axially restoring force by axial biasing the orbiting scroll member 54 or the non-orbiting scroll member 66 towards the opposing scroll using compressed working fluid.

The utilization of an axial restoring force typically entails one of the two scroll members 54, 66 being mounted for axial movement with respect to the other scroll member. This can be accomplished by securing the non-orbiting scroll member 66 to a main bearing housing 24. Second, a biasing load applied to the axially movable non-orbiting scroll member 66 urges the non-orbiting scroll member 66 into engagement with the orbiting scroll member 54. This can be accomplished by forming a chamber on the side of the non-orbiting scroll member 66 opposite to the orbiting scroll member 54, placing a floating seal assembly 78 in the chamber and then supplying a pressurized fluid to this chamber. The source of the pressurized fluid can be the scroll compressor itself. Thus, an annular recess 76 can be formed in non-orbiting scroll member 66, within which is disposed the floating seal assembly 78. Recesses 72 and 76 and floating seal assembly 78 cooperate to define axial pressure biasing chambers which receive pressurized fluid being compressed by involute portions 56 and 68, so as to exert an axial biasing force on non-orbiting scroll member 66 to thereby urge the tips 52 of respective involute portions 56, 68 into sealing engagement with the opposed end plate surfaces.

Figure 2:
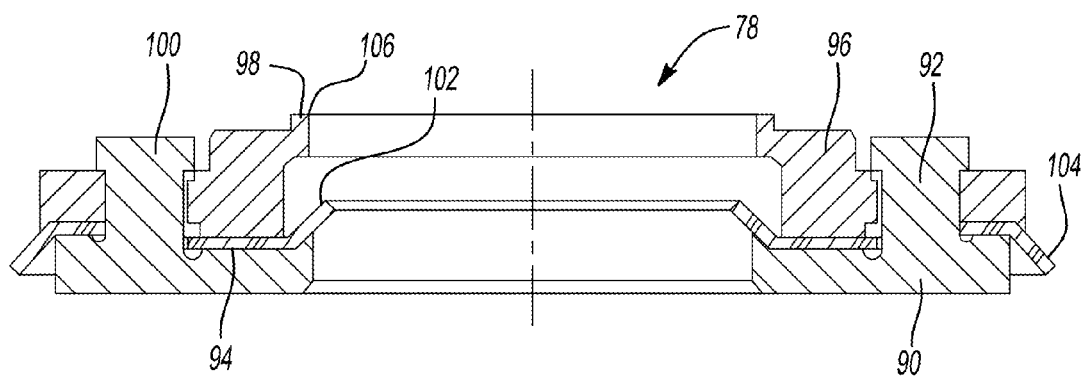
FIG. 2 is a partial sectional view showing a floating seal assembly as in FIG. 1.
Figure 3:
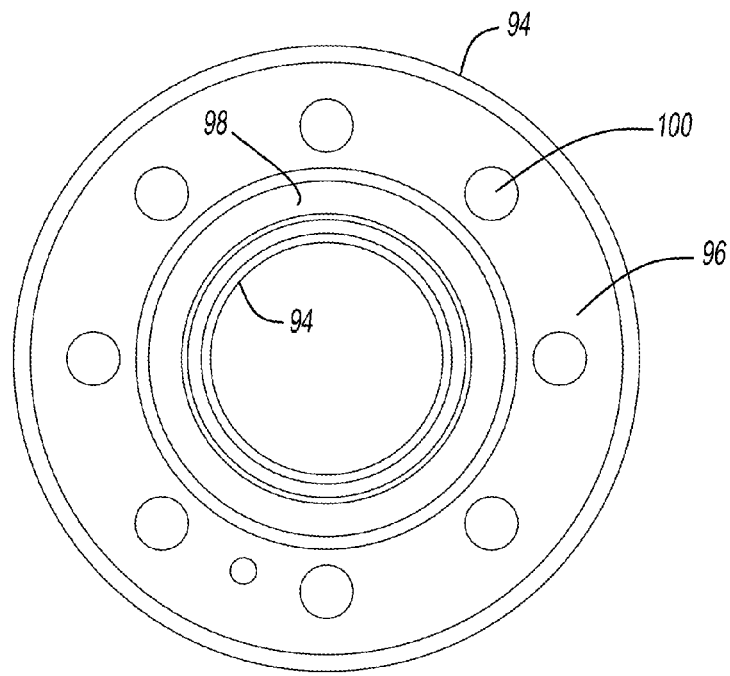
FIG. 3 is a plan view showing an upper seal plate forming a portion of the floating seal assembly as in FIG. 1.

With reference to FIGS. 1-3, a conventional floating seal assembly 78 is shown which has a coaxial sandwiched construction that comprises an annular base plate 90 conventionally formed out of a metal, such as cast iron or aluminum. Such floating seal assemblies generally function as a valve to enable or prevent flow of high-pressure refrigerant gas from a high pressure discharge area to the low pressure suction/inlet area in the compressor 10. At normal operating conditions for the compressor 10, the valve is closed and a face seal minimizes bypass of gas from a discharge side to an inlet/suction side. The valve will, however, open in response to a high discharge-to-suction pressure ratio in the compressor 10 to prevent system failure.

Thus, in the design shown in FIGS. 1-3, an annular base plate 90 has a plurality of equally spaced upstanding integral projections 92. Disposed on base plate 90 is an annular gasket or seal 94 having a plurality of equally spaced holes which receive projections 92. On top of seal 94 is disposed an annular upper seal plate 96 having a plurality of equally spaced holes receiving projections 92. Upper annular seal plate 96, which is conventionally formed of a metal, such as grey cast iron, has disposed about the periphery thereof an upwardly projecting planar seal lip that defines a sealing lip or face seal 98. The floating seal assembly 78 is secured together by swaging the ends of each projection 92 as indicated at 100.

The overall seal assembly 78 therefore provides three distinct seals, namely, an inside diameter seal at 102, an outside diameter seal at 104 and a top or face seal at 106. Seal 102 isolates fluid under intermediate pressure in the bottom of recess 76 from fluid under discharge pressure in recess 72. Seal 104 isolates fluid under intermediate pressure in the bottom of recess 76 from fluid at suction pressure within shell 12. Seal 106 isolates fluid at suction pressure within shell 12 from fluid at discharge pressure across the top of floating seal assembly 78. FIGS. 1 and 2 illustrate a wear ring 108 attached to partition plate 22 (that in alternative embodiments which are not shown, could be attached to a separate partition plate attached to shell 12 or partition), which provides seal 106 between face seal 98 (of plate 96) and wear ring 108. In lieu of wear ring 108, the lower surface of partition plate 22 can be locally hardened by nitriding, carbo-nitriding or other hardening processes known in the art to form the partition plate 22 against which the face seal 98 can interface.

The diameter of seal 106 is chosen so that there is a positive upward sealing force on floating seal assembly 78 under normal operating conditions, at normal pressure ratios. Therefore, when excessive pressure ratios are encountered, floating seal assembly 78 will be forced downwardly by discharge pressure, thereby permitting a leak of high side discharge pressure gas directly across the top of floating seal assembly 78 to a zone of low side suction gas. If this leakage is great enough, the resultant loss of flow of motor cooling suction gas (aggravated by the excessive temperature of the leaking discharge gas) will cause a motor protector (not shown) to trip, thereby de-energizing the motor. The width of seal 106 is chosen so that the unit pressure on the seal itself (e.g., between face seal 98 and wear ring 108) is greater than normally encountered discharge pressure, to promote consistent sealing. The discharge pressure of compressor 10 urges the inner lip seal portion of seal 94 into engagement with non-orbiting scroll member 66 to form the inside diameter seal at 102.

Thus, conventional floating seals, like 78, can be an assembly of two metal plates and one or more polymer sealing rings. The lower seal plate 90 is often formed of as-cast aluminum (or other metals) including the vertical posts 92 that fit through holes or openings 100 in the upper seal plate 96. Upper seal plate 96 is often formed of cast iron (or other metals). The upper seal plate 96 has the face seal 98 feature incorporated into its top surface that interacts with a partition plate 106 (e.g., muffler plate) to form seal 106 whenever the two components are in contact. The polymer seals 94 are located by and held between the two seal plates 90, 96. The assembly process for conventional seal assemblies involves stacking the pieces together and then plastically deforming the aluminum posts 92 such that the top ends locally spread out over the lower seal plate 90 to form a rigid and secure attachment.

When assembled, the one or more polymer seals 94 are retained by the two seal plates 90, 96 in a first plane and the sealing interface with the non-orbiting scroll member 66 occurs along a surface of the non-orbiting scroll member 66 that is generally perpendicular to the plane of retention by the two plates 90, 96. Thus, the one or more polymer seals 94 bend through an approximately ninety-degree angle to achieve their sealing.

In various aspects, the present teachings provide an improved seal design for a scroll compressor, by providing simpler construction with fewer pieces by using a molded composite on the upper seal plate that serves as a face seal for the seal assembly. In certain aspects, the present disclosure provides a seal component for a scroll compressor that includes a preformed seal plate. In certain aspects, the preformed seal plate is formed of a material comprising a metal. The seal component further includes a molded portion, which is formed from a second material distinct from the metal material of the seal plate. In various aspects, the molded portion is coupled to the preformed seal plate. The molded portion is often coupled to one or more locking features formed in the preformed seal plate. Such an improved seal design includes the injection-molded portion of the floating seal for use in scroll compressors.

The molded portion may thus optionally define a face seal and/or a discharge passage of the seal component, which may be used as part of a floating seal assembly. In certain variations, this disclosure provides a molded thermoplastic composite, semi-compliant face seal. Such a thermoplastic composite molded portion provides greater ability to conform to the counter-surface, such as a partition plate or muffler plate or wear plate (like wear ring 108), and allows changes to a floating seal assembly design and the corresponding muffler plate design to enhance sealability and seal performance. It can also permit elimination of the hardened washer or wear plate 106, attached to the partition plate 22 (or alternatively to a muffler plate or other partition, not shown), by introducing the thermoplastic composite to the face seal component, which provides enhanced wear resistance.

The preformed seal plate may comprise a metal and thus be formed by casting, forging, or powder metallurgy. In certain alternative embodiments, the preformed seal plate may itself be formed of a reinforced polymeric composite material. In certain preferred aspects, the seal plate is formed in a first process via powder metallurgy techniques, which provides high dimensional accuracy. For example, powder metal formation processes desirably permit tight tolerances and near-net shapes to be formed, while allowing for tailoring of the tribological characteristics of one or more sealing surfaces in the seal plate to enhance sealing and, hence, compressor operation. Forming the seal plate with sintered powdered metal can help to provide better dimensional tolerances and enhance adhesion to the molded portion, while still meeting the rigorous physical requirements that are desirable for a scroll compressor seal. Thus, in certain aspects, when seal plates comprise a sintered porous powder metal, there is advantageously no requirement for machining of the seal plate to form various features described herein. However, as described below, in alternative variations, the seal plates comprising a sintered porous powder metal may also have one or more features machined therein.

Thus, in certain aspects, one or more seal components of a scroll compressor can be formed from a sintered powder metal. Certain aspects of the present disclosure pertain to scroll compressor seal components formed by powder metallurgy formation techniques. As used herein, the term "powder metallurgy" encompasses those techniques that employ powdered (i.e., powder) metal materials (e.g., a plurality of metal particulates) to form a discrete shape of a metal component via sintering, where the powder mass or bulk is heated to a temperature below the melting point of the main constituent of the powder material, thereby facilitating metallurgical bonding and/or fusing of the respective particles. In certain aspects, a binding or fixturing step may precede sintering to form a green form. Sintering or binding steps may further volatilize binders and other components. A powder metal material may include a plurality of particulates having an average particle size of greater than or equal to about 10 micrometers (μm), optionally greater than or equal to about 100 μm and in various aspects, generally having an average particle size of less than or equal to about 200 μm. Such particle sizes are merely exemplary in nature and are non-limiting. A powder metal material may further comprise binders or other conventional components, known in the art, as will be discussed in greater detail below. Powder metallurgy techniques are described in U.S. Pat. No. 6,705,848, the disclosure of which is hereby incorporated herein by reference in its entirety.

In certain variations, a final sintered density of the porous metal component (e.g., seal plate) is greater than or equal to about 6.5 g/cm$^3$, and in certain aspects, greater than or equal to about 6.8 g/cm$^3$. The density can assist with complying with the fatigue strength requirements of the component. Leakage through the interconnected metal porosity can be a concern (as may cause seal leakage) resulting in potential loss of compressor efficiency. Higher density sintered porous metal components can have sufficient structure to produce pressure tightness without additional treatment. However, impregnation of the pores with polymers or other materials, steam treatment or infiltration (polymeric, metal oxides, or metallic) may be incorporated into the pores to further seal off interconnected pores, if necessary. Although the net shape and dimensional accuracy of the sintered seal plate can be an important manufacturing consideration, the seal plate may receive post-processing, such as machining.

After pre-forming the seal plate, in various aspects, the joining of the powder metal seal plate to the molded portion is accomplished by disposing the preformed seal plate in a mold cavity and then injection-molding a second material comprising a polymeric precursor or resin and one or more reinforcing particles into one or more void regions in the mold cavity. In certain aspects, preferred methods for forming such a component are via conventional vertical injection molding into a mold cavity containing the preformed seal plate. In alternative variations, the methods for forming such a component are via conventional horizontal injection molding into a mold cavity containing a preformed seal plate. The seal plate preferably defines one or more locking features that promote retention and coupling to the injected second material comprising polymer resin. The seal plate having the injected second material can then optionally be solidified or cooled and removed from the mold cavity. Thus, in its final form, the molded portion comprises a polymeric composite.

The polymer resin may be further provided with a reinforcement or lubricating phase (e.g., reinforcing or lubricating filler particles or fibers) that forms a polymeric composite, which is particularly advantageous for use as a part of a seal component in a scroll member. A "composite" can refer to a material which includes a polymer resin or matrix having a plurality of reinforcing or lubricating particles distributed throughout as a reinforcement phase. Composite polymer matrices provide additional strength and structural integrity, while providing superior wear resistance for use as a seal material. In various aspects, suitable polymers include a thermoplastic resin, which provides a heat-resistant matrix for at least one or more distinct reinforcing or lubricating particles to form the molded portion that serves as a compliant wear-resistant face seal component. Suitable thermoplastic polymers can be selected from the polyaryletherketone (PAEK) family. In certain variations, the polyaryletherketone (PAEK) thermoplastic polymer can be selected from the group consisting of: polyetherketone (PEK), polyetheretherketone (PEEK), polyetheretheretherketone (PEEEK), polyetherketoneketone (PEKK), polyetheretherketoneketone (PEEKK) polyetherketoneetheretherketone (PEKEEK), and polyetheretherketonetherketone (PEEKEK) and combinations thereof. In other variations, the thermoplastic matrix material may comprise polyamide imide (PAI), polyphenylene sulfide (PPS), or polyimide (PI) alone or as combined with any of the other suitable thermoplastic polymers discussed just above. In certain variations, the thermoplastic polymer is selected from the group consisting of: a polyaryl ether ketone (PAEK) or other ultra-performing polymer including, but not limited to poly(phenylene sulphide) (PPS), poly(sulphone) (PS), polyamide imide (PAI), or polyimide (PI). In certain variations, a particularly desirable carrier material or thermoplastic polymer is an ultra-performance, high temperature thermoplastic resin, such as a member of the polyaryl ether ketone (PAEK) family like polyetheretherketone (PEEK).

Reinforcing or lubricating particles for the composite material of the molded portion of the seal component may include inorganic materials, metals, or high performance polymeric materials (particles or fibers). The reinforcing particles or fillers can be any number of anti-friction/anti-wear compounds including, but not limited to inorganic fillers, organic fillers, and polymeric particles used as fillers. Thus a solid material in particulate form (e.g., a plurality of solid particles) that contributes to a low coefficient of friction or provides additional tribological or synergistic properties to the overall anti-wear material composition, while reinforcing the resin in the composite, is particularly desirable. In various aspects, the molded portion of the seal component comprises at least one reinforcing or lubricating particle. In certain preferred variations, a suitable composite for the molded portion of the seal component comprises a first reinforcing or lubricating particle and a second reinforcing or lubricating particle distinct from the first reinforcing or lubricating particle. In yet other variations, the composite for the molded portion of the seal component may comprise three or more distinct reinforcing and/or lubricating particles.

In certain variations, the molded portion of the seal component comprises a plurality of reinforcing particles that are distinct from one another. In certain variations, the molded portion comprises at least one reinforcing or lubricating particle selected from the group consisting of: polytetrafluoroethylene (PTFE), molybdenum disulfide (MoS$_2$), tungsten disulfide (WS$_2$), antimony trioxide, hexagonal boron nitride, carbon fiber, graphite, graphene, lanthanum fluoride, carbon nanotubes, polyimide particles (or powderized polyimide polymer), polybenzimidazole (FBI) particles, and combinations thereof. In certain embodiments, a first reinforcing particle and a second reinforcing particle distinct from the first reinforcing particle can be independently selected from the group consisting of: polytetrafluoroethylene (PTFE) particles (or powderized PTFE), molybdenum disulfide (MoS$_2$) particles, tungsten disulfide (WS$_2$), antimony trioxide, hexagonal boron nitride particles, carbon fibers, graphite particles, graphene particles, lanthanum fluoride, carbon nanotubes, polyimide particles (or powderized polyimide polymer), poly(benzimidazole (PBI) particles (e.g., fibers), and combinations thereof. In certain preferred variations, three distinct reinforcing or lubricating particles are independently selected from the group consisting of: poly(tetrafluoroethylene) (PTFE), graphite, carbon fiber, antimony trioxide, carbon nanotubes, polyimide, and combinations thereof. In certain variations, a first reinforcing or lubricating particle comprises poly(tetrafluoroethylene) (PTFE) particles, while a second reinforcing or lubricating particle comprises graphite, and a third reinforcing or lubricating particle comprises carbon fiber.

Thus, in certain aspects, the present disclosure pertains to scroll compressor seal components formed by conventional polymeric molding techniques, such as polymer injection molding. These molding methods employ a thermoplastic polymer precursor injected into a mold, which is optionally heated and/or cooled to solidify the polymer and form the molded polymeric component. As noted above, vertical injection molding processes are particularly desirable.

Figure 4:
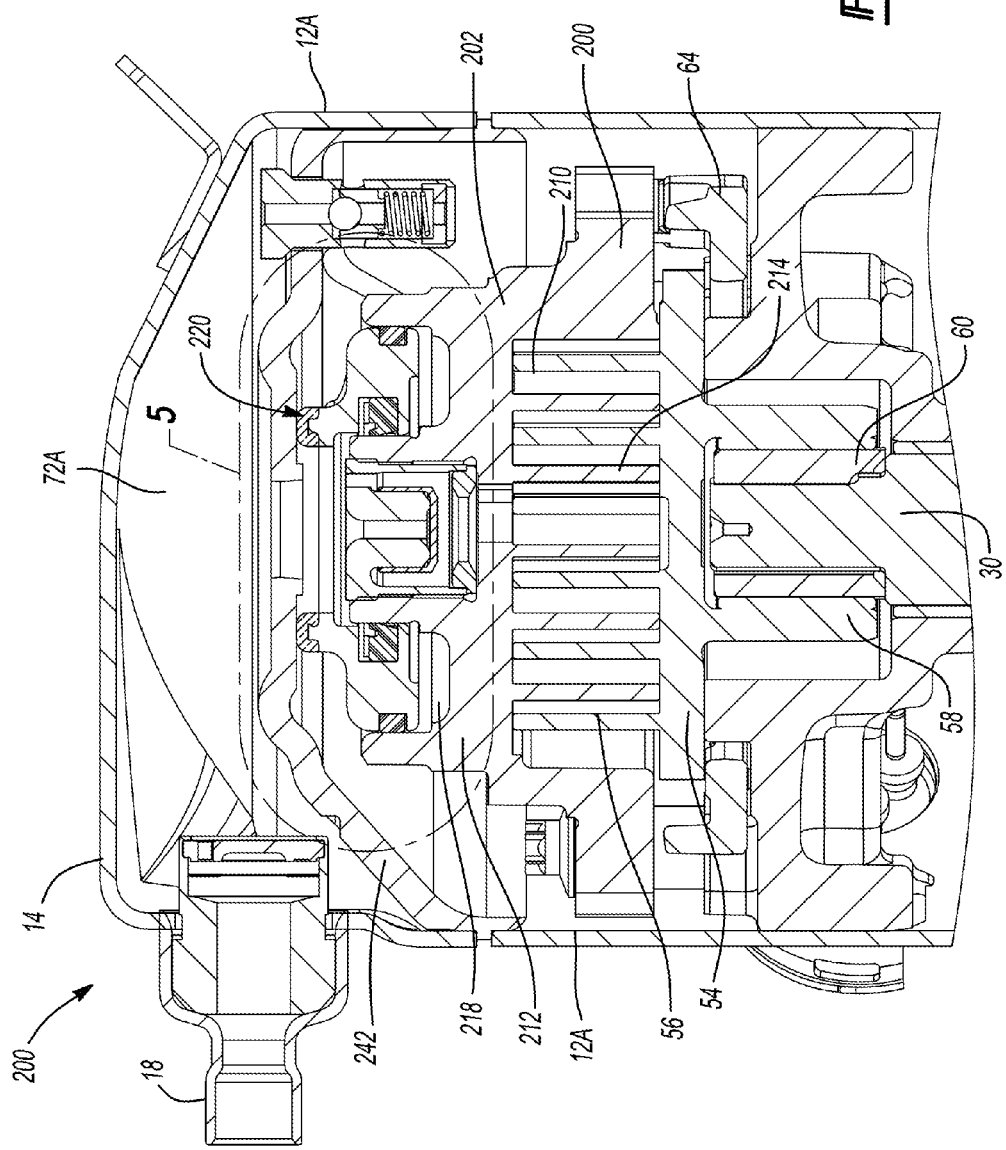
FIG. 4 is a partial sectional view through a center of a scroll compressor having a design in accordance with certain aspects of the present disclosure.

Therefore, in various aspects, the present disclosure thus provides a seal component for a scroll compressor that includes a preformed seal plate and a molded portion comprising a polymeric composite material. One such embodiment is shown in FIG. 4. In FIG. 4, various components of the scroll compressor 200, including the orbiting scroll member 54 are the same as that shown in FIG. 1, and includes an orbiting involute portion 56 and a cylindrical hub 58. An Oldham coupling 64 prevents rotation between the orbiting scroll member 54 and the non-orbiting scroll member 201. For brevity, other conventional components previously discussed in the context of FIG. 1 will not be reintroduced in subsequent discussion of the figures, unless pertinent to the features discussed herein.

In the embodiment shown in FIG. 4, the scroll compressor component is a non-orbiting scroll member 201 having a baseplate 202 defining a first side 210 and a second side 212 opposite to the first side 210. The first side 210 comprises an involute portion 214 extending from the baseplate 202. The second side 212 comprises a cavity 218 having a seal component assembly 220 disposed therein.

Figure 5:
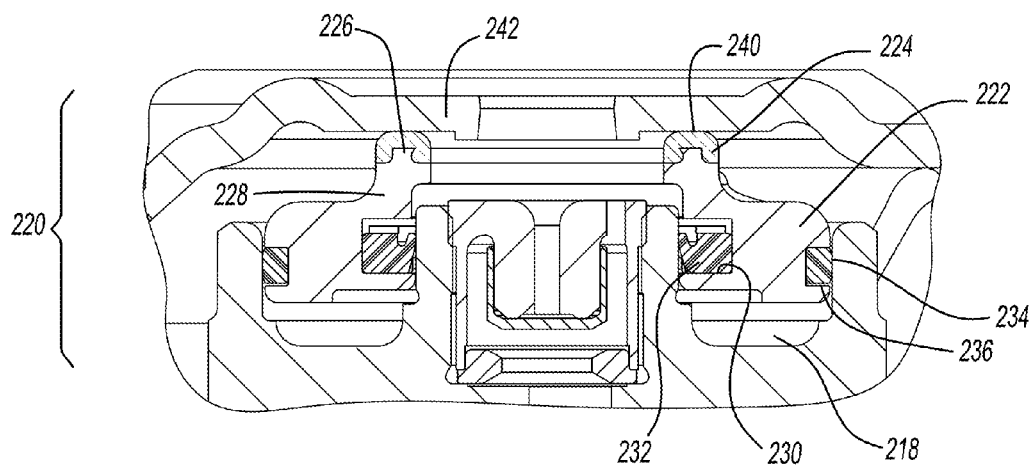
FIG. 5 is a detailed cross-sectional view of a top portion of a scroll compressor as in FIG. 4.
Figure 6:
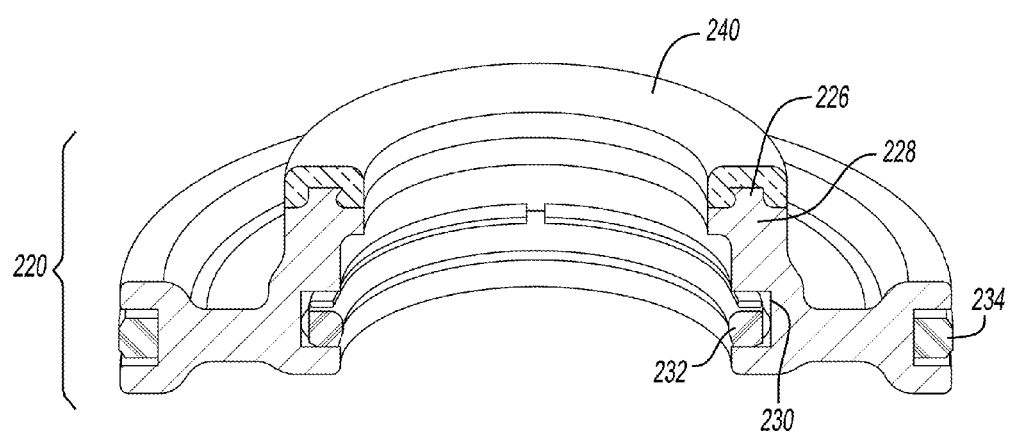
FIG. 6 is a partial sectional view of a seal assembly comprising a seal plate and a molded top portion according to certain aspects of the present disclosure as shown in FIGS. 4-5.

As best shown in FIGS. 5-6, the seal component assembly 220 comprises a seal plate 222 and an upper molded portion 224 that is molded to the seal plate 222 (which can be preformed) and forms a face seal of the seal component assembly 220. In various aspects, the molded portion 224 provided by the present disclosure is a composite that comprises at least one thermoplastic polymer and at least one reinforcing particle. The seal plate 222 defines a protruding annular flange 226 that extends upwards from a raised annular portion 228 (in other words, an upper lip portion) of the seal plate 222. The protruding annular flange 226 is centrally disposed on an upper surface of the raised annular portion 228.

The seal plate 222 further defines a first internally disposed recessed cavity 230 (radially inward) that receives a first annular seal 232. The first annular seal 232 can be a dynamic elastomeric seal. A suitable first annular seal 232 can be a self-bleeding seal commercially available from Parker. The seal plate 222 further comprises a second recessed cavity 234 (radially outward) on a peripheral outer edge of the seal plate 222 that receives a second annular seal 236. The second annular seal 236 can be a dynamic elastomeric seal. For example, a suitable second annular seal 236 can be a conventional D-ring seal. Thus, when the seal component assembly 220 is seated in cavity 218 of the baseplate 202, the first seal 232 and the second seal 234 interface with the cavity's 218 lateral walls to provide sealing and axial biasing.

Likewise, the molded portion 224 has a contact surface 240 that serves as a face seal by interfacing with a wear surface on an opposing partition plate 242 (when assembled in the compressor 201). The partition plate 242 is attached to shell 12A that defines discharge chamber 72A. The partition plate 242 can be finish machined or alternatively left in a rough machined condition, so as to have a plurality of grooves formed therein which can act as an oil reservoir during compressor operation, thus providing boundary lubrication and overall improved functionality of the face seal.

In certain aspects, a seal plate prepared in accordance with various aspects of the present teachings may comprise a metallic material, such as aluminum, ferrous alloys, like gray iron or steel, and the like. Such a seal plate may be cast of gray iron, for example. In certain embodiments, the seal plate is formed of a porous sintered powder metal material, such as a porous sintered steel or porous sintered aluminum. In certain other variations, the seal plate can be formed from cast iron that is subsequently machined or from a die cast aluminum. Alternatively, the seal plate may comprise a polymeric composite (prior to forming the overmolded portion) and optionally comprises a thermoplastic polymer, such as polyphenylene sulfide (PPS) or polyphthalamide (PPA), or a thermoset polymer, such as a phenolic resin or fiberglass-reinforced polyester.

Thus, the seal plate 222 may be formed of a porous sintered powder metal material. In certain alternative embodiments, to be described in more detail below, the seal component assembly may comprise additional distinct seal plates and components that are used in conjunction with the preformed seal plate having the molded portion. For example, a seal plate can be an upper seal plate and the seal component assembly further comprises a second metallic seal plate that is a lower seal plate. However, in the seal plate 222 embodiment of FIG. 4, only a single unitary seal plate is present. Thus, the simplified design shown in this embodiment desirably eliminates any need for an upper seal plate and a lower seal plate (and the assembly process required for joining multiple seal plates).

In certain aspects, methods of making seal component assemblies comprising a seal plate with a molded face seal component are also provided. A method of forming such a seal component of a scroll compressor optionally includes disposing a preformed metal seal plate in a mold cavity that defines a seal component shape. The preformed seal plate can define one or more locking features (e.g., mechanical locking features) to promote attachment to a resin material during injection molding. After the preformed seal plate is disposed in the mold cavity, one or more void regions are present that are adjacent to at least a region of the preformed seal plate. A composite material precursor comprising a polymer resin and one or more reinforcing or lubricating particles is injected into the mold cavity to fill the one or more void regions to form a molded portion coupled to the preformed seal plate. In certain aspects, after injection, the composite material precursor can be cooled by conventional techniques to form the composite material.

In accordance with the principles of the present disclosure, the seal component is pre-formed by a first formation process with a first material. As discussed above, particularly suitable materials for the preformed seal plate include powder metal materials, which can be formed with high dimensional tolerance and have desirable physical properties, including strength and durability. In certain other aspects, the seal plate can be formed by a metal casting process. Therefore, in certain variations, the preformed seal plate is formed of a sintered powder metal. For example, powder metal particles can be introduced to a mold having a seal plate shape, where the powder metal, optionally including binders or other diluents, can be heated and sintered to form the seal plate. Suitable metal materials for forming a seal plate comprise iron, aluminum, alloys, and combinations thereof, as discussed above. It should be noted that the present disclosure is not limited to the seal plate being formed of a single first material, but rather in certain aspects may include a plurality of different compositions or materials used to form the seal plate. Notably, while certain preferred embodiments may describe seal plate components being formed of certain materials, other materials are likewise contemplated. Thus, where a preformed seal plate is indicated to be formed of a sintered powder metal, in certain alternative variations, the preformed seal plate may instead be formed of metal created by casting, forging, or other techniques known to those of skill in the art.

In various aspects, the molded portion of the seal component is formed by a second formation process with a second material that forms a composite. The present teachings are not limited to the molded portion being formed of a single second material, but rather in certain aspects may include a plurality of different compositions or materials that form the molded portion. In certain preferred aspects, the second material of the molded portion comprises a composite comprising a resin (or a plurality of resins) and a reinforcing particle (or a plurality of reinforcing particles), such as particles or fibers. In accordance with various aspects of the present disclosure, the molded portion is formed from the second material via a molding process, such as an injection molding process, such that the molded portion is in contact with and desirably coupled to (e.g., fixedly attached to) the seal plate.

Thus, the second material optionally comprises a polymer resin and one or more reinforcing or lubricating particles (dispersed in the polymer resin) that is injection molded into a mold cavity. The preformed seal plate can be disposed in the mold cavity and thus defines one or more void regions that surround at least a portion or region of the preformed seal plate. The void regions may correspond to one or more locking features defined in the seal plate. The second material is injected into the one or more void regions. The polymer can be subsequently cured or cross-linked via exposure to heat, radiation, curing agents, or the like.

In various aspects, the present disclosure contemplates methods of forming seal components for a scroll compressor. The seal plate is preformed via a formation process for metallic materials. For example, the seal plate can be preformed by sintering a powder metal material in the shape of the seal plate. The preformed seal plate is then disposed in a mold cavity (not shown) that defines an overall shape of the seal plate. When the preformed seal plate is disposed in the mold cavity, one or more voids are formed adjacent to and in contact with at least a portion or region of the preformed seal plate. The void regions receive the second material so as to create molded portion in contact with the preformed seal plate. In certain aspects, a preformed seal plate is disposed in a mold cavity (not shown) defining a seal component shape and a second material is introduced into one or more void regions of the mold cavity surrounding and in contact with at least a region of the preformed seal plate. In certain aspects, a second material is introduced into the mold cavity by injecting the second material into the one or more void regions, which will define the molded portion adjacent to and in contact with at least a region of the seal plate.

In alternative variations, the molded portion may be preformed and then press-fitted onto the seal plate, attached or coupled thereto. In yet other processes, the thermoplastic polymer can be provided in the form of a powder (along with powder-forms of one or more reinforcing agents), so that the molded portion can be formed by powder coating the polymer via process such as electrostatic deposition and corresponding baking of the material.

One example of a process for forming a seal component according to certain aspects of the present disclosure is shown in FIGS. 7A-7C. As noted above, a preformed seal plate 260 (for example, an upper seal plate) may comprise a metal and thus be formed by casting, forging, or powder metallurgy. In certain embodiments, the seal plate is formed in a first process via powder metallurgy techniques described above. The powder metal material is processed to form a green component. In some aspects, this processing generally includes introducing the powder metal material into a die, which may define a shape such as a seal plate component. The powder material may then be compressed in the die. In certain aspects, the component is processed to a green form by compressing the powder metal material to a void fraction of less than or equal to about 25% by volume of the total volume of the scroll component (in other words, a remaining void space of about 25% of the total volume of the shape) and optionally less than or equal to about 20% of the void volume of the component. Thus, in various aspects the powder metal material (generally including a lubricant system) is placed in a mold of a desired shape and is then compressed with all materials intact. The compression forms a green form, which holds a shape corresponding to the die shape.

As shown in FIG. 7A, the preformed seal plate 260 is an upper seal plate for use in a seal component assembly (not shown). A near net shape of a sintered porous metal material is formed, which defines a raised upper annular portion 262 and a centrally disposed open channel 264. The centrally disposed channel 264 defines a first lower region 266 with a first diameter and a second upper region 268 with a second diameter. The first diameter of the centrally disposed channel 264 is greater than the second diameter.

In a second step shown in FIG. 7B, the preformed seal plate 260 is machined along a portion of the raised upper annular portion 262. Thus, a circumferential groove 270 is formed along the second upper region 268. After machining, a centrally disposed protruding annular flange 272 extends upwards from the raised upper annular portion 262 (in other words, an upper lip portion) of the seal plate 260. This centrally disposed protruding annular flange 272 thus defines an interlocking feature to which a molded portion can be attached during an injection molding step. It should be noted that the present teachings also contemplate alternative embodiments where the near-net shape of the sintered powder metal seal plate 260 has the protruding annular flange 272 pre-formed in the shape and thus does not require any machining prior to coupling the molded portion thereto.

During the injection molding, the machined preformed seal plate 260 is disposed in an injection molding cavity or die, so that a void is formed near the raised upper annular portion 262. A composite material comprising a polymeric resin and a reinforcing or lubricating material is injected into the molding cavity or die to fill a void around the centrally disposed protruding annular flange 272 locking feature. The composite material may be heated within the mold. FIG. 7C shows the seal plate 260 after removal from the injection molding cavity. An annular molded portion 276 is thus formed over the protruding annular flange 272 of the raised upper annular portion 262. The annular molded portion 276 when assembled within the scroll compressor (and disposed in a fixed non-orbiting scroll member) can thus define a face seal that interacts with a partition plate (e.g., muffler plate) in the compressor and/or a portion of a discharge passage for discharging compressed refrigerant fluids from the scroll members to the pressurized discharge passage.

Thus, in certain aspects, the methods of the present disclosure provide a seal component for a scroll compressor that includes a preformed seal plate and a molded portion. In certain aspects, the preformed seal plate is formed of a material comprising a metal. The seal component further includes a molded portion, which is formed from a second material distinct from the metal material of the seal plate. In various aspects, the molded portion is coupled to the preformed seal plate. The second material can be disposed around a locking feature (or features) or within aperture(s) to couple the preformed seal plate to the molded portion. The present disclosure further provides a seal component having a seal plate that comprises at least one feature capable of forming a locking feature when overmolded with a composite material, so that the at least one locking feature interacts with and retains the molded portion. The preformed seal plate comprises a centrally disposed opening, so that the at least one locking feature is disposed adjacent to the centrally disposed opening. In certain aspects, the at least one locking feature selected from the group consisting of: a protruding annular flange, a circumferential groove, a transverse annular protrusion, a circumferential flange, a circumferential seat, a longitudinal channel, a locking wing, and combinations thereof. Thus, the locking feature or features are configured to securely mate and couple the seal plate with the molded portion. While preferred variations, the design, configurations, and number of locking features described herein are non-limiting and other designs, numbers, and configurations of locking features are likewise contemplated. The molded portion may define a face seal and/or a portion of a discharge passage of the seal component.

As shown in FIG. 7A, the preformed seal plate 260 is an upper seal plate for use in a seal component assembly (not shown). A near net shape of a sintered porous metal material is formed, which defines a raised upper annular portion 262 and a centrally disposed open channel 264. The centrally disposed channel 264 defines a first lower region 266 with a first diameter and a second upper region 268 with a second diameter. The first diameter of the centrally disposed channel 264 is greater than the second diameter.

In a second step shown in FIG. 7B, the preformed seal plate 260 is machined along a portion of the raised upper annular portion 262. Thus, a circumferential groove 270 is formed along the second upper region 268. After machining, a centrally disposed protruding annular flange 272 extends upwards from the raised upper annular portion 262 (in other words, an upper lip portion) of the seal plate 260. This centrally disposed protruding annular flange 272 thus defines an interlocking feature to which a molded portion can be attached during an injection molding step. During the injection molding, the machined preformed seal plate 260 is disposed in an injection molding cavity or die, so that a void is formed near the raised upper annular portion 262. A composite material comprising a polymeric resin and a reinforcing material is injected into the molding cavity or die to fill a void around the centrally disposed protruding annular flange 272. The composite material may be heated or cooled within the mold for solidification. FIG. 7C shows the seal plate 260 after removal from the injection molding cavity. An annular molded portion 276 is thus formed over the protruding annular flange 272 of the raised upper annular portion 262. The annular molded portion 276 when assembled within the scroll compressor (and disposed in a fixed non-orbiting scroll member) can thus define a face seal that interacts with a partition plate (e.g., muffler plate) or other partition in the compressor and/or a portion of a discharge passage for discharging compressed refrigerant fluids from the scroll members to the pressurized discharge passage.

Thus, in certain aspects, the methods of the present disclosure provide a seal component for a scroll compressor that includes a preformed seal plate and a molded portion. In certain aspects, the preformed seal plate is formed of a material comprising a metal. The seal component further includes a molded portion, which is formed from a second material distinct from the metal material of the seal plate. In various aspects, the molded portion is coupled to the preformed seal plate. The second material can be disposed around a locking feature (or features) or within aperture(s) to couple the preformed seal plate to the molded portion. The molded portion may define a face seal and/or a portion of a discharge passage of the seal component.

In yet another embodiment, an alternative version of an interlocking feature on the preformed seal plate is shown in FIG. 8. A preformed seal plate 300 defines a protruding annular flange 302 in a raised upper annular portion 304. A centrally disposed protruding annular flange 310 is defined after an inner circumferential groove 306 is formed (e.g., by machining) in the protruding annular flange 302. This centrally disposed protruding annular flange 310 thus defines a first interlocking feature to which a molded portion 312 can be attached during an injection molding step. In certain aspects, the molded portion 312 comprises a reinforcing particle filled PEEK composite that is overmolded onto a powder metal upper seal plate 300. The molded portion 312 thus defines an annular protrusion on the top surface of the upper seal plate 300.

In the design shown in FIG. 8, an outer diameter surface of an exterior wall 314 of the protruding annular flange 310 also includes a second lateral circumferential groove 316 centrally disposed (mid-way up) in external wall 314 of the protruding annular flange 310. The second lateral circumferential groove 316 increases surface area and enhances coupling and retention of the molded portion 312 to the seal plate 300. It should be noted that the cross-sectional shape of the second lateral circumferential groove 316 as shown is a half-circle; however, the groove may have other shapes, as well. Furthermore, in alternative embodiments, a plurality of distinct lateral grooves on either side of the protruding annular flange 310 may be employed to enhance retention of the molded portion 312. The present teachings further contemplate alternative embodiments where the near-net shape of the sintered powder metal seal plate includes the inner circumferential groove and/or second lateral circumferential groove as being preformed in the shape and thus does not require any machining prior to coupling the molded portion thereto. Thus, in certain aspects, when seal plate 300 comprises a sintered porous powder metal, there is advantageously no requirement for machining of the seal plate 300.

Yet another embodiment of a seal component for a seal assembly is shown in FIG. 9. A preformed seal plate 350 is an upper seal plate for use with a lower seal plate in a seal component assembly (not shown). A near net shape of a sintered porous metal material is formed, which defines a raised upper annular portion 352 and a centrally disposed open channel 360. When the seal plate 350 is an upper seal plate, it may optionally comprise a plurality of apertures 354, which can interact with and couple to a lower seal plate (not shown). The raised upper annular portion 352 defines an upper circumferential ledge or seat 362 as a locking feature along an inner circumference corresponding to the centrally disposed open channel 360.

The preformed seal plate 350 further comprises a plurality of longitudinal channels 364 longitudinally extending through portions of the body (transverse to a plane of the circumferential seat 362) of the seal plate 350 in a region adjacent to the centrally disposed open channel 360. The respective longitudinal channels 364 are circumferentially spaced apart at regular intervals along the raised upper annular portion 352 around the centrally disposed open channel 360. Such channels 364 may be pressed, drilled, or preformed into the inner diameter of body of the upper seal plate 350. The channels 364 serve as interlocking features to promote attachment of an overmolded portion 368. In certain aspects, the molded portion 368 comprises a reinforcing or lubricating particle filled PEEK composite that is overmolded onto a powder metal upper seal plate 350. Thus, during injection molding, the polymeric composite can enter the channels 360 of the seal plate and also form a protruding annular molded portion disposed within the circumferential seat 362. Notably, an upper contact surface 370 of the molded portion 368 extends above the raised upper annular portion 352, so as to define an exposed face seal region.

Another seal component for a seal assembly is shown in FIG. 10. A preformed seal plate 400 can be an upper seal plate for use with a lower seal plate in a seal component assembly (not shown). A near net shape of a sintered porous metal material is formed, which defines a raised upper annular portion 402 and a centrally disposed open channel 404. When the seal plate 400 is an upper seal plate, it may optionally comprise a plurality of apertures 406, which can interact with and couple to a lower seal plate (not shown). In this embodiment, a distinct interlocking design for a molded portion 410 is shown.

The raised upper annular portion 402 defines an upper circumferential ledge or groove 412 along an inner circumferential surface 416 corresponding to the centrally disposed open channel 404. Along the inner circumferential surface 416, below the circumferential groove 412, is a transverse annular protrusion 420 that extends transversely from the inner circumferential surface 416 into the centrally disposed open channel 404 (e.g., transverse to the raised upper annular portion 402, but parallel to a lateral plane defined by the seal plate 400). The annular protrusion 420 has a substantially rectangular shape; however, other shapes are likewise contemplated. In such an embodiment, the transverse annular protrusion 420 thus defines an interlocking feature for the molded portion 410.

The centrally disposed channel 404 thus defines a first lower region 422 with a first diameter, a second region 424 with a second diameter corresponding to the region where the annular protrusion 420 is present. The centrally disposed channel 404 further comprises a third upper region 426 having a third diameter that corresponds to the circumferential groove 412. The second diameter (corresponding to the second region 424 where the annular protrusion 420 extends into the centrally disposed channel 404) is the smallest diameter, while the largest diameter corresponds to the third diameter of the third upper region 426 (and corresponding to circumferential groove 412). The first diameter in the first lower region 422 is greater than the second diameter, but less than the third diameter.

When the molded portion 410 is overmolded onto the upper regions of the seal plate 400, it forms a ring structure that extends above and below the transverse annular protrusion 420. Thus, the molded portion 410 defines an annular ring that is seated in the circumferential groove (and thus extends to the third diameter), extends over the annular protrusion 420 (corresponding to the second diameter), and contacts the first lower region 422 (corresponding to the first diameter) to form a "c-shaped" cross section. Thus, during injection molding, the polymeric composite can surround the annular protrusion 420 of the seal plate 400 and also form a protruding annular molded portion disposed within the circumferential groove 412. Notably, an upper contact surface 428 of the molded portion 410 extends above the raised upper annular portion 402 so as to define an exposed face seal region.

In certain aspects, the molded portion 410 optionally comprises a reinforcing or lubricating particle filled PEEK composite that is overmolded onto a powder metal upper seal plate 400. In other variations, the seal plate 400 may be formed of a cast gray iron that is machined to form the design shown. While not shown, certain alternative embodiments are contemplated where the seal plate 400 can optionally comprise additional pressed-in locking features (a groove or transecting channel) to minimize circumferential rotation of the molded portion 410.

FIGS. 11A and 11B show a top and bottom view of yet another embodiment of a seal component prepared in accordance with certain aspects of the present teachings. A preformed seal plate 450 is an upper seal plate for use with a lower seal plate in a seal component assembly (not shown). The preformed seal plate 450 has a top side 452 and a bottom side 454. The seal plate 450 includes a raised upper annular portion 456 and a centrally disposed open channel 458. When the seal plate 450 is an upper seal plate, it may optionally comprise a plurality of apertures 460, which can interact with and couple to a lower seal plate (not shown).

The raised upper annular portion 456 of the preformed seal plate 350 comprises a plurality of channels 462 circumferentially spaced apart at regular intervals and extending longitudinally through portions of the body (transverse to the raised upper annular portion 456) of the seal plate 350 in a region adjacent to the centrally disposed open channel 458. Such channels 462 may be pressed, drilled, or pre-formed into the inner diameter of body of the upper seal plate 450. The channels 462 serve as interlocking features to promote attachment of an overmolded portion 470. As can be seen, the channels 462 each further define a terminal locking wing 472 that is wider than a narrower entrance passage 474 of the channel 462, which further promotes attachment of the molded portion 470 to the seal plate 450. Thus, during injection molding, the polymeric composite flows into and through channels 462 along entrance passage regions 474 into the wing regions 472 and forms the molded portion 470. Such a design can thus introduce additional retention of the molded portion 470 to the seal plate 450. In certain aspects, the molded portion 470 comprises a reinforcing or lubricating particle filled PEEK composite that is overmolded onto a powder metal upper seal plate 450. Again, an upper contact surface 476 of the molded portion 470 extends above the raised upper annular portion 456, so as to define an exposed face seal region.

Another seal component for a seal assembly is shown in FIGS. 12A-12B that has improved sealing for certain applications. The seal assembly 500 comprises a preformed upper seal plate 502 having a molded portion 510 attached thereto, a lower seal plate 504 and an elastomeric seal 506 disposed between the upper seal plate 502 and the lower seal plate 504. As in previous embodiments, the upper seal plate 502 can be preformed as a near net shape from a sintered porous metal material. The upper seal plate 502 has a raised upper annular portion 512 and a centrally disposed open channel 514. Notably, the lower seal plate 504 likewise has an opening or channel 516, so that together open channels 514 and 516 define a discharge opening in the seal assembly 500. Upper seal plate 502 comprises a plurality of apertures 518, which receive swaging portions 520 of the lower seal plate 504 to couple the upper seal plate 502 and lower seal plate 504 together.

The raised upper annular portion 512 of upper seal plate 502 defines an upper circumferential flange 522 along an inner circumferential surface 524 corresponding to the centrally disposed open channel 514. The upper circumferential flange 522 extends transversely from the inner circumferential surface 524 into the centrally disposed open channel 514. The flange 522 has a substantially rectangular shape; however, other shapes are likewise contemplated.

In such an embodiment, upper circumferential flange 522 thus defines an interlocking feature for the molded portion 510. The centrally disposed open channel 514 of the upper seal plate 502 thus defines a first lower region 526 with a first diameter, a second region 528 with a second diameter corresponding to the region where the upper circumferential flange 522 is present. When the molded portion 510 is overmolded to the seal plate 502, it forms an annular molded structure that extends from above a first upper surface 530 to a second lower surface 532 of the seal plate 502 and thus substantially covers the inner circumferential surface 524. An upper contact surface 534 of the molded portion 510 extends above the raised upper annular portion 512 so as to define an exposed face seal region.

When assembled in the floating seal assembly 500, the entire circumference of the molded portion 510 thus extends down to an inner lip seal region 538 of the inner seal 506. The molded portion 510 material can thus desirably taper to a very thin thickness near inner lip seal region 538, for example down to about 0.010 inch. This configuration can serve to minimize or prevent high pressure discharge gas (540) from entering behind the overmold material in the overmold portion 510 and from leaking into a low pressure suction gas side (542) in certain compressor design scenarios.

In certain aspects, the molded portion 510 optionally comprises a reinforcing or lubricating particle filled PEEK composite that is overmolded onto the metal upper seal plate 502. As in any of the previous embodiments described above, the upper seal plate 502 (as well as the lower seal plate 504) may instead be formed of a cast gray iron or other metal that is machined to form the design shown or as a powder metal near net shape that likewise may be further machined.

In another aspect of the present disclosure, an alternative version of a molded portion attached to a preformed seal plate is shown in FIG. 13. A preformed seal plate 550 defines a raised upper annular portion 552 and a centrally disposed open channel 554. An inner circumferential step or shoulder 560 is formed (e.g., by machining a groove or forming such a groove/shoulder in near-net shape by powder metal (PM) formation) in a protruding annular flange 562. In such an embodiment, a molded ring portion 570 is in a ring-shape that has a rectangular cross-sectional shape. Other cross-sectional shapes are also contemplated, as well. Thus, the molded ring portion 570 can be seated and secured onto the inner circumferential shoulder 560. In certain variations, the molded ring portion 570 can be pre-formed and then press-fitted (optionally adhered) into the preformed seal plate 550. In other variations, the molded ring portion 570 can be formed in the inner circumferential shoulder 560 of the preformed seal plate 550. As with other embodiments, the molded ring portion 570 can comprise a reinforced composite material, such as a PEEK composite comprising a plurality of reinforcing or lubricating particles. The molded ring portion 570 forms an annular protrusion that defines an upper contact surface 572 of the upper seal plate 550.

Accordingly, in certain aspects of the present teachings, a seal component is formed that comprises a preformed seal plate and a molded portion formed of a composite material comprising a polymer and one or more reinforcing materials. The molded portion may thus optionally define a face seal and/or a discharge passage of the seal component, which may be used as part of a floating seal assembly. In certain aspects, the face seal is thus an injection-moldable thermoplastic composite material with an ultra-high melting temperature. In certain embodiments, a polymer used in the thermoplastic composite comprises poly(ether ether ketone) (PEEK). As discussed previously above, such a composite material can be filled with friction and wear enhancers (and synergistic components), including, but not limited to, poly(tetrafluoroethylene) (PTFE) particles, graphite particles, carbon fiber, antimony trioxide, carbon nanotubes, and polyimide particles or fibers.

In various aspects, the molded portion is coupled to the preformed seal plate, which can occur via vertical injection molding techniques, for example. The process may optionally involve an over-molding step in which the polymer is molded onto the top of the upper seal plate. This process utilizes the properties of PEEK (and related PAEK family polymers) that enable good bonding with metal, along a circumferential groove, or physical or mechanical interlock to permanently affix a face seal.

In certain aspects, an upper seal plate is a near net shape porous sintered powder metal that has minimal machining.

The powder metal surface provides greater roughness and inherent porosity that enhances the mechanical load required to cleave a thermoplastic composite ring via additional frictional forces provided by the natural undercuts (to reduce premature failure). Likewise, the increase in polymer/powder metal contact surface also increases the polymer adhesion characteristics. Such an improved seal design for use in scroll compressors is provided by the injection-molded portion of the floating seal.

In certain variations, this disclosure provides a molded thermoplastic composite, semi-compliant face seal. Such a thermoplastic composite molded portion provides greater ability to conform to the counter-surface, such as a partition plate (e.g., muffler plate) and allows changes to a floating seal assembly design and the corresponding partition or muffler plate design to enhance sealability and seal performance. It can also permit elimination of the hardened washer, wear ring, or wear plate by introducing the thermoplastic composite to the face seal component, which provides enhanced wear resistance and in certain aspects, may provide enhanced lubricity, as well.

In certain aspects, a corresponding partition plate or muffler plate embodiment can be a standard low (or plain carbon) steel component that has minimal machining. Greater surface roughness than the standard machining process can be tolerated when used in conjunction with certain variations of the thermoplastic composite molded portion of the seal plate to improve sealing via controlled and biased high point contact (with the more compliant face seal composite material). Such troughs can also act as localized lubrication wells for oil lubricant to enhance the friction/wear characteristics of the molded composite (e.g., comprising PEEK).

In certain variations, the composite material comprises (i) a thermoplastic polyaryletherketone (PAEK) polymer; and at least one reinforcing particle or lubricating particle selected from the group consisting of: polytetrafluoroethylene (PTFE), molybdenum disulfide ($MoS_2$), tungsten disulfide ($WS_2$), antimony trioxide, hexagonal boron nitride, carbon fiber, graphite, graphene, lanthanum fluoride, carbon nanotubes, polyimide particles (or powderized polyimide polymer), polybenzimidazole (PBI) particles, and combinations thereof. Other alternative wear additives include other thermoplastic polymers, such as polyamide-imide (Torlon®) or polyetherimide (PEI). As noted above, the polyaryletherketone (PAEK) thermoplastic polymer can be selected from the group consisting of: polyetherketone (PEK), polyetheretherketone (PEEK), polyetheretheretherketone (PEEEK), polyetherketoneketone (PEKK), polyetheretherketoneketone (PEEKK) polyetherketoneetheretherketone (PEKEEK), and polyetherketonetherketone (PEEKEK) and combinations thereof. Suitable copolymer or blended PEEK polymers include those commercially available as Avaspire® from Solvay Plastics or Dynasil™. In certain variations, the composite material comprises (i) a thermoplastic polyetheretherketone (PEEK) polymer; and at least one reinforcing or lubricating particle selected from the group consisting of: PTFE particles, graphite particles, carbon fibers, and combinations thereof.

In certain aspects, the composite material comprises a thermoplastic polymer at greater than or equal to about 40% to less than or equal to about 97.5% by mass of the total composite material. In certain aspects, the composite comprises one or more reinforcing particles present in the composite material at greater than or equal to about 2.5% to less than or equal to about 60% by mass of the total mass of the composite material. The one or more reinforcing or lubricating particles present in the composite material may be selected from the group consisting of: PTFE particles, graphite particles, carbon fibers, and combinations thereof. In certain variations, the composite material comprises a thermoplastic polymer, a first reinforcing or lubricating particle, a second reinforcing or lubricating particle, and a third reinforcing or lubricating particle. Thus, the composite material optionally comprises a thermoplastic polymer at greater than or equal to about 40% to less than or equal to about 75% by mass of the total composite material, while the plurality of reinforcing or lubricating particles are collectively present at greater than or equal to about 25% to less than or equal to about 60% by mass of the total composite material. In certain aspects, the first reinforcing or lubricating particle is present in the composite material at greater than or equal to about 2.5% to less than or equal to about 20% by mass of the total mass of the composite material. The second reinforcing or lubricating particle is present at greater than or equal to about 2.5% to less than or equal to about 20% by mass of the total mass of the composite material. The third reinforcing or lubricating particle is present at greater than or equal to about 2.5% to less than or equal to about 20% by mass of the total mass of the composite material.

In one aspect, the composite material optionally comprises a thermoplastic polymer at about 70% by mass of the total composite material, while the plurality of reinforcing or lubricating particles are collectively present at about 30% of the total composite material. In certain aspects, the thermoplastic polymer comprises PEEK. In certain aspects, the first reinforcing particle comprises PTFE particles present in the composite material at about 10% by mass of the total mass of the composite material. The second reinforcing or lubricating particle comprises graphite particles present at about 10% by mass of the total mass of the composite material. The third reinforcing or lubricating particle comprises carbon fibers present at about 10% by mass of the total mass of the composite material.

In certain variations, the composite material consists essentially of (i) a thermoplastic polyaryletherketone (PAEK) polymer; and at least one reinforcing or lubricating particle selected from the group consisting of: polytetrafluoroethylene (PTFE), molybdenum disulfide ($MoS_2$), tungsten disulfide ($WS_2$), antimony trioxide, hexagonal boron nitride, carbon fiber, graphite, graphene, lanthanum fluoride, carbon nanotubes, polyimide particles (or powderized polyimide polymer), polybenzimidazole (FBI) particles, and combinations thereof. In certain variations, the composite material consists essentially of (i) a thermoplastic polyaryletherketone (PAEK) polymer and at least one reinforcing particle selected from the group consisting of: PTFE particles, graphite particles, carbon fibers, and combinations thereof.

FIG. 14 shows compressive stress testing for various composite material candidates for a molded portion of the seal component according to certain aspects of the present teachings. The graph provides compressive stress (pounds per square inch) versus compressive strain (%) tested at 300° F. (about 149° C.). A strain rate is about 0.22 inches per minute. A first composite comprises PEEK and silica (glass particles). A second composite comprises about 70% by mass PEEK and 30% by mass PTFE particles. A third composite comprises about 90% by mass PEEK and 10% by mass PTFE particles. A fourth composite comprises about 80% by mass PEEK, 10% by mass PTFE particles, and 10% by mass graphite particles. A fifth composite comprises about 70% by mass PEEK, 10% by mass PTFE particles, 10% by mass graphite particles, and 10% by mass carbon fibers. An acceptable usage zone is shown, along with a more rigorous compressor loading regime. The candidate materials all show desirable compressive strength in the operating regimes of interest.

FIG. 15 shows comparative wear testing for various molded portion composite material candidates according to certain aspects of the present teachings. FIG. 15 shows average wear (per inch) versus test duration (hours). The polymer contact surface/face is tested against an as-machined material (having an average surface roughness ($R_a$) of about 0.6-1.4). A first composite comprises about 80% by mass PEEK, 10% by mass PTFE particles, and 10% by mass graphite particles. A second composite comprises PEEK and silica (glass particles). A third composite comprises about 90% by mass PEEK and 10% by mass PTFE particles. A fourth composite comprises about 70% by mass PEEK and 30% by mass PTFE particles. The materials each demonstrated relatively low wear rates in the application test under the unique and aggressive conditions it has been exposed to.

In various aspects, a compliant face seal is provided by employing non-metallic materials on a seal component for a scroll compressor. Such embodiments can provide the ability to eliminate the wear disc on a mating partition plate or muffler plate, in certain aspects. Further, enhanced wear resistance, and in certain aspects enhanced lubricity, in the face seal region is provided in various aspects of the present teachings via thermoplastic composite filler addition. Such variations can provide improved system efficiency via improved high/low side sealability. Moreover, such designs can provide simpler compressor designs requiring fewer components or less processing of components that are included. For example, non-exhaustive benefits of the inventive technology include the fact that the upper seal plate does not need to be machined, the partition plate or muffler plate does not need to be machined, a wear disc can be eliminated (between the face seal and partition plate or muffler plate or partition), a unitary seal plate can eliminate a floating seal assembly process, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A scroll compressor comprising:
a first non-orbiting scroll member having a baseplate defining a first side and a second side opposite to the first side, wherein the first side comprises an involute portion extending from the baseplate and the second side comprises a cavity having a floating seal assembly disposed therein, the floating seal assembly comprising a seal plate and a molded structural portion overmolded onto a region of the seal plate, wherein the seal plate comprises a metal, the molded structural portion comprises a thermoplastic polymer and at least one reinforcing or lubricating particle, the molded structural portion defines a first contact surface; and
a second contact surface on a partition plate that interfaces with at least a region of the first contact surface of the molded structural portion.

2. The scroll compressor of claim 1, wherein the seal plate is an upper seal plate and the floating seal assembly further comprises a second metallic seal plate that is a lower seal plate.

3. The scroll compressor of claim 1, wherein the seal plate comprises a non-machined sintered porous powder metal material and the second contact surface on the partition plate comprises a non-machined cast metallic material.

4. The scroll compressor of claim 1, wherein the seal plate defines at least one locking feature to interact with and retain said molded structural portion.

5. The scroll compressor of claim 4, wherein the seal plate comprises a centrally disposed opening and the at least one locking feature is disposed adjacent to the centrally disposed opening, wherein the at least one locking feature is selected from the group consisting of: a circumferential groove, an annular protrusion, a circumferential flange, a longitudinal channel, a locking wing, and combinations thereof.

6. The scroll compressor of claim 1, wherein the thermoplastic polymer is selected from the group consisting of: polyaryletherketone (PAEK), polyetherketone (PEK), polyetheretherketone (PEEK), polyetheretheretherketone (PEEEK), polyetherketoneketone (PEKK), polyetheretherketoneketone (PEEKK) polyetherketoneetheretherketone (PEKEEK), polyetherketonetherketone (PEEKEK), poly(phenylene sulphide) (PPS), poly(sulphone) (PS), polyamide imide (PAI), polyimide (PI), and combinations thereof.

7. The scroll compressor of claim 1, wherein the at least one reinforcing or lubricating particle is selected from the group consisting of: polytetrafluoroethylene (PTFE), molybdenum disulfide ($MoS_2$), tungsten disulfide ($WS_2$), antimony trioxide, hexagonal boron nitride, carbon fiber, graphite, graphene, lanthanum fluoride, carbon nanotubes, polyimide, polybenzimidazole (PBI), and combinations thereof.

8. The scroll compressor of claim 1, wherein the thermoplastic polymer comprises polyetheretherketone (PEEK) and the at least one reinforcing or lubricating particle is selected from the group consisting of:
polytetrafluoroethylene (PTFE), graphite, carbon fibers, and combinations thereof.

9. The scroll compressor of claim 1, wherein the first contact surface is a face seal contact surface and the second contact surface is a wear surface on the partition plate.

* * * * *